US011030781B2

(12) United States Patent
Kelley et al.

(10) Patent No.: US 11,030,781 B2
(45) Date of Patent: *Jun. 8, 2021

(54) SYSTEMS FOR COLLECTING, AGGREGATING, AND STORING DATA, GENERATING INTERACTIVE USER INTERFACES FOR ANALYZING DATA, AND GENERATING ALERTS BASED UPON COLLECTED DATA

(71) Applicant: Palantir Technologies Inc., Palo Alto, CA (US)

(72) Inventors: Sean Kelley, San Francisco, CA (US); Dylan Scott, Palo Alto, CA (US); Ayush Sood, Menlo Park, CA (US); Kevin Verdieck, Palo Alto, CA (US); Izaak Baker, Palo Alto, CA (US); Eliot Ball, West Yorkshire (GB); Zachary Bush, Menlo Park, CA (US); Allen Cai, Menlo Park, CA (US); Jerry Chen, San Jose, CA (US); Aditya Dahiya, Brooklyn, NY (US); Daniel Deutsch, Palo Alto, CA (US); Calvin Fernandez, New York, NY (US); Jonathan Hong, Millbrae, CA (US); Jiaji Hu, Stanford, CA (US); Audrey Kuan, London (GB); Lucas Lemanowicz, New York, NY (US); Clark Minor, Palo Alto, CA (US); Nicholas Miyake, Redwood City, CA (US); Michael Nazario, Menlo Park, CA (US); Brian Ngo, San Francisco, CA (US); Mikhail Proniushkin, Palo Alto, CA (US); Siddharth Rajgarhia, San Francisco, CA (US); Christopher Rogers, Vienna, VA (US); Kayo Teramoto, San Francisco, CA (US); David Tobin, Atherton, CA (US); Grace Wang, New York, NY (US); Wilson Wong, Menlo Park, CA (US); Holly Xu, New York, NY (US); Xiaohan Zhang, Mountain View, CA (US)

(73) Assignee: Palantir Technologies Inc., Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 16/574,648

(22) Filed: Sep. 18, 2019

(65) Prior Publication Data

US 2020/0013203 A1    Jan. 9, 2020

Related U.S. Application Data

(63) Continuation of application No. 15/699,134, filed on Sep. 8, 2017, now Pat. No. 10,460,486, which is a (Continued)

(51) Int. Cl.
*G06F 16/00* (2019.01)
*G06T 11/20* (2006.01)
(Continued)

(52) U.S. Cl.
CPC .......... *G06T 11/206* (2013.01); *G06F 16/245* (2019.01); *G06Q 10/0633* (2013.01); *G06Q 10/0639* (2013.01); *G06Q 10/06313* (2013.01)

(58) Field of Classification Search
CPC .............. G06T 11/206; G06Q 10/0639; G06Q 10/0633; G06Q 10/06313; G06F 16/245
(Continued)

(56) References Cited

U.S. PATENT DOCUMENTS 8,812,960 B1* 8/2014 Sun ..................... G06Q 10/10
715/757
9,792,020 B1  10/2017 Kelley et al.
(Continued)

*Primary Examiner* — Thanh-Ha Dang
(74) *Attorney, Agent, or Firm* — Knobbe, Martens, Olson & Bear, LLP

(57) ABSTRACT

Systems and methods for aggregating and storing different types of data, and generating interactive user interfaces for analyzing the stored data. In some embodiments, entity data is received for a plurality of entities from one or more data sources, and used to determine attribute values for the entities for one or more given time periods. The plurality of entities may be categorized into one or more entity groups, and aggregate attribute values may be generated based upon the entity groups. A first interactive user interface is generated displaying the one or more entity groups in association with the aggregated attribute values associated with the entity group. In response to a received indication of a user selection of an entity group, a second interactive user interface is generated displaying the one or more entities associated with the selected entity group, each entity displayed in association with the attribute values associated with the entity.

20 Claims, 12 Drawing Sheets

Related U.S. Application Data continuation of application No. 15/146,754, filed on May 4, 2016, now Pat. No. 9,792,020.

(60) Provisional application No. 62/273,257, filed on Dec. 30, 2015.

(51) Int. Cl.
*G06Q 10/06* (2012.01)
*G06F 16/245* (2019.01)

(58) Field of Classification Search
USPC .......................................................... 707/723
See application file for complete search history.

(56) References Cited

U.S. PATENT DOCUMENTS

| | | | |
|---|---|---|---|
| 10,460,486 B2 | 10/2019 | Kelley et al. | |
| 2004/0153437 A1* | 8/2004 | Buchan | G06Q 10/06 |
| 2005/0154628 A1* | 7/2005 | Eckart | G06Q 10/06 |
| | | | 705/35 |
| 2009/0009317 A1* | 1/2009 | Weaver | G06Q 10/06 |
| | | | 340/517 |
| 2011/0061013 A1* | 3/2011 | Bilicki | G06Q 10/06393 |
| | | | 715/771 |
| 2011/0208565 A1* | 8/2011 | Ross | G06Q 10/0639 |
| | | | 705/7.38 |
| 2012/0084117 A1* | 4/2012 | Tavares | G06Q 30/00 |
| | | | 705/7.29 |
| 2012/0144335 A1* | 6/2012 | Abeln | G06Q 10/087 |
| | | | 715/771 |
| 2012/0221553 A1* | 8/2012 | Wittmer | G06F 16/26 |
| | | | 707/722 |
| 2013/0110695 A1* | 5/2013 | Domowitz | G06Q 40/04 |
| | | | 705/37 |
| 2013/0282696 A1* | 10/2013 | John | G06F 16/951 |
| | | | 707/722 |
| 2014/0279948 A1* | 9/2014 | Mahate | G06Q 10/10 |
| | | | 707/692 |
| 2015/0046233 A1* | 2/2015 | Srulowitz | G06Q 10/06398 |
| | | | 705/7.42 |
| 2015/0278325 A1* | 10/2015 | Masuda | H04Q 9/00 |
| | | | 707/624 |
| 2015/0309908 A1* | 10/2015 | Pearson | G06F 11/3006 |
| | | | 714/57 |
| 2016/0248624 A1* | 8/2016 | Tapia | H04L 43/065 |

* cited by examiner

DAILY REPORT

< SEPTEMBER 6, 2015 >    TODAY   214

| Group A | Active Entities | Agg. Attribute 1 | Agg. Attribute 2 | Agg. Attribute 3 | Agg. Attribute 4 |
|---|---|---|---|---|---|
| 78 Entity Type 1 | 27   -10 | 16.2   +2.2 | 5.5   +310 | 8.2   +200 | 6.5   +3.2 |
| 45 Entity Type 2 | 206 | | | | |

| Group B | Active Entities | Agg. Attribute 1 | Agg. Attribute 2 | Agg. Attribute 3 | Agg. Attribute 4 |
|---|---|---|---|---|---|
| 69 Entity Type 1 | 30   0 | 5.8   -2.1 | 6.1   -10 | 15.9   -2.1 | 18.5   -6.2 |
| 23 Entity Type 2 | | | | | |

204   208

ENTITY TESTS   3
- M-1   1   >
- M-2   1   >
- M-3   1   >

STATUS CHANGES   0
No items available

216

ENTITY GROUP UPDATES   9

Mon, Oct 5, 2014
3:00PM
High instrument reading, no need to do further diagnostics,
***online @ 600.

Mon, Oct 5, 2014
5:00PM
Instrument online @ 700.

Mon, Oct 5, 2014
3:00PM
High instrument reading, no need to do further diagnostics,
***online @ 800

Tue, Oct 6, 2014
2:00PM
*Continued job for ******

OPERATOR NOTES   0
No items available

NOTES
Write a note here   POST
****************
My note

2 Groups

— RETURN     B Group     8 ⓘ LOGOUT
          < October 8, 2015 >

PRODUCTION     | ABSOLUTE | PERCENTAGE | Attribute 2 ▽ |

Agg. Attribute 1   +100 Agg. Attribute 2   -600 Agg. Attribute 3   +900 Agg. Attribute 4   -100
60,001     6,700     12,000     200,000

1. UPDATE

STATUS CHANGES   1
Entity Offline     2
********
********

| 1 | ACTIVE | 2 | ACTIVE | 3 | ACTIVE | 4 | ACTIVE | 5 | ACTIVE | 6 | ACTIVE |
|---|---|---|---|---|---|---|---|---|---|---|---|
| TYPE 1 | | TYPE 1 | | TYPE 1 | | TYPE 1 | | TYPE 1 | | TYPE 1 | |
| Attribute 1 | | Attribute 1 | | Attribute 1 | | Attribute 1 | | Attribute 1 | | Attribute 1 | |
| 288 | -2 | 6,800 | -20 | 400 | -600 | 90 | 30 | 8,000 | -700 | 8,000 | -800 |
| Attribute 2 | | Attribute 2 | | Attribute 2 | | Attribute 2 | | Attribute 2 | | Attribute 2 | |
| 700 | 6 | 700 | -1 | 600 | 245 | 80 | -10 | 700 | -10 | 700 | 20 |
| Attribute 3 | | Attribute 3 | | Attribute 3 | | Attribute 3 | | Attribute 3 | | Attribute 3 | |
| 50 | -8 | 700 | 20 | 800 | 20 | 70 | -50 | 8000 | 100 | 6,000 | 200 |
| Attribute 4 | | Attribute 4 | | Attribute 4 | | Attribute 4 | | Attribute 4 | | Attribute 4 | |
| 40,000 | 600 | 60,000 | 200 | 67,000 | -600 | 20,000 | -10 | 22,000 | -600 | 7,000 | 60 |
| Attribute 5 | | Attribute 5 | | Attribute 5 | | Attribute 5 | | Attribute 5 | | Attribute 5 | |
| 70 | 6 | 210 | -2 | 20 | 9 | 120 | 6 | 0 | 0 | 200 | 10 |
| Attribute 6 | | Attribute 6 | | Attribute 6 | | Attribute 6 | | Attribute 6 | | Attribute 6 | |
| 1000 | 8 | 200 | 7 | 800 | 10 | 1200 | -8 | 700 | 9 | 210 | 15 |

| 7 | ACTIVE | 8 | ACTIVE | 9 | ACTIVE | 10 | ACTIVE | 11 | ACTIVE | 12 | ACTIVE |
|---|---|---|---|---|---|---|---|---|---|---|---|
| TYPE 1   302 | | TYPE 1 | | TYPE 1 | | TYPE 1 | | TYPE 1 | | TYPE 1 | |
| Attribute 1 | | Attribute 1 | | Attribute 1 | | Attribute 1 | | Attribute 1 | | Attribute 1 | |
| 7,000 | -100 | 8,000 | | 7,000 | | 46 | -1 | 7,000 | 12 | 400 | 800 |
| Attribute 2 | | Attribute 2 | | Attribute 2 | | Attribute 2 | | Attribute 2 | | Attribute 2 | |
| 700 | -10 | 800 | -2 | 700 | | 12 | | 600 | | 70 | 100 |

300
304

SYSTEMS FOR COLLECTING, AGGREGATING, AND STORING DATA, GENERATING INTERACTIVE USER INTERFACES FOR ANALYZING DATA, AND GENERATING ALERTS BASED UPON COLLECTED DATA

CROSS-REFERENCE TO RELATED APPLICATIONS

This application is a continuation of U.S. patent application Ser. No. 15/699,134, filed Sep. 8, 2017, entitled "SYSTEMS FOR COLLECTING, AGGREGATING, AND STORING DATA, GENERATING INTERACTIVE USER INTERFACES FOR ANALYZING DATA, AND GENERATING ALERTS BASED UPON COLLECTED DATA," which is a continuation of U.S. patent application Ser. No. 15/146,754, filed May 4, 2016, entitled "SYSTEMS FOR COLLECTING, AGGREGATING, AND STORING DATA, GENERATING INTERACTIVE USER INTERFACES FOR ANALYZING DATA, AND GENERATING ALERTS BASED UPON COLLECTED DATA," which application claims the benefit of U.S. Provisional Patent Application No. 62/273,257, filed Dec. 30, 2015, entitled "SYSTEMS FOR COLLECTING, AGGREGATING, AND STORING DATA, GENERATING INTERACTIVE USER INTERFACES FOR ANALYZING DATA, AND GENERATING ALERTS BASED UPON COLLECTED DATA," each of which is incorporated herein in its entirety.

Any and all applications for which a foreign or domestic priority claim is identified in the Application Data Sheet as filed with the present application are hereby incorporated by reference under 37 CFR 1.57.

TECHNICAL FIELD

The present disclosure relates to systems and techniques for collecting and aggregating attribute data associated with a plurality of entities, and generating alerts for user review.

BACKGROUND

A user managing a large number of entities, such as machines in a manufacturing facility, computers on a network, and/or the like, needs to be able to have a clear picture of how the entities are performing, both individually and as a group. Measured attribute values associated with the entities can be collected and presented to the user for review. For example, for entities corresponding to manufacturing machines, measured attribute values may correspond to machine production rate measurements, power consumption measurements, machine status measurements, and/or the like. However, if the number of entities being managed is large, it may be difficult for the user to make sense of the presented information, to identify potential issues with one or more managed entities, or to focus analysis on important areas.

SUMMARY

The systems, methods, and devices described herein each have several aspects, no single one of which is solely responsible for its desirable attributes. Without limiting the scope of this disclosure, several non-limiting features will now be discussed briefly.

Some embodiments are directed to a computer system for collecting, aggregating and storing entity data, and generating interactive user interfaces for analyzing entity data, the system comprising: a computer processor; one or more databases storing data corresponding to a plurality of entities, the plurality of entities, each entity associated with one or more data sources configured to generate a plurality of entity data values over time; and a computer readable storage medium storing program instructions configured for execution by the computer processor in order to cause the computing system to: for each entity of the plurality of entities: receive entity data from the one or more data sources associated with the entity, the entity data comprising a plurality of entity data value measured over time; using the received entity data values, determine one or more attribute values for the entity for a given time period; categorize the plurality of entities into one or more entity groups; for each entity group of the one or more entity groups, aggregate the attribute values of the one or more entities associated with the entity group to determine one or more aggregate attribute values for the entity group for the given time period; generate a first interactive user interface displaying the one or more entity groups in association with at least a portion of the aggregated attribute values associated with the entity group; and, in response to a received indication of a user selection of an entity group of the one or more entity groups, generate a second interactive user interface, the second interactive user interface displaying the one or more entities associated with the selected entity group, each entity of the one or more entities displayed in association with at least a portion of the attribute values associated with the entity.

In some embodiments, the one or more attribute values comprise at least an operational status and a production value.

In some embodiments, the first interactive user interface further comprises, for each displayed aggregate attribute value, a graph illustrating values of the aggregate attribute value over multiple previous time periods.

In some embodiments, the first interactive user interface may further comprises, for each displayed aggregate attribute value, a change value indicating a change in the aggregate attribute value from a previous time period.

In some embodiments, the one or more databases comprises a first data source and a second data source, and the computer system is further configured to: retrieve, from the first data source, job data corresponding to a plurality of jobs, each job being associated with at least one entity of the one or more entities associated with the selected entity group, a job time, and a job cost; retrieve, from the second data source, production data comprising production values determined over time associated with the one or more entities; associate each job with a cumulative cost, the cumulative cost indicating a total cost of jobs associated with entities of the selected entity group to the job time of the job; associate each job with a production value, based at least in part upon the job time; generate a chart plotting cumulative costs against production values for the plurality of jobs.

In some embodiments, each job is associated with a production value change, based upon a first production value associated with a first time and a second production value associated with a second time, the first time occurred before the job time associated with the job, and the second time occurring after the job time.

In some embodiments, the system is further configured to: in response to an entity being in a non-operational status, flag the entity for review by the user, wherein the entity is associated with a reason for non-operation; in response to a received indication that the user has reviewed the entity, unflag the entity; and re-flag the entity for review by the user, in response to a detection that a designated period of time has passed since the user has previously reviewed the entity, or in response to detection of a change in a condition associated with the reason for non-operation, wherein the detected change is inconsistent with the reason for non-operation. In some embodiments, the designated period of time is based at least in part upon an attribute value or job status associated with the reason for non-operation. The condition may be associated with an attribute value of the entity, and wherein the detected change corresponds to a detection that the attribute value is not within an undesired value range.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, existing applications are limited in various ways, and various embodiments of the disclosure provide significant improvements over such technology. Additionally, various embodiments of the present disclosure are inextricably tied to computer technology. In particular, various embodiments rely on collection and aggregation of entity data values from a plurality of data sources, calculation of aggregated attribute values based upon received user inputs, automatic mapping of data from different data sources, generation of charts based upon received user inputs, automatic generation of alerts based upon a status of one or more monitored entities, and presentation of the aggregated data and alert data to be displayed to a user via interactive graphical user interfaces. Such features and others are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic image data.

Additional embodiments of the disclosure are described below in reference to the appended claims, which may serve as an additional summary of the disclosure.

In various embodiments, computer systems are disclosed that comprise one or more hardware computer processors in communication with one or more non-transitory computer readable storage devices, wherein the one or more hardware computer processors are configured to execute the plurality of computer executable instructions in order to cause the computer system to perform operations comprising one or more aspects of the above-described embodiments (including one or more aspects of the appended claims).

In various embodiments, computer-implemented methods are disclosed in which, under control of one or more hardware computing devices configured with specific computer executable instructions, one or more aspects of the above-described embodiments (including one or more aspects of the appended claims) are implemented and/or performed.

In various embodiments, non-transitory computer-readable storage mediums storing software instructions are disclosed, wherein, in response to execution by a computing system having one or more hardware processors, the software instructions configure the computing system to perform operations comprising one or more aspects of the above-described embodiments (including one or more aspects of the appended claims).

BRIEF DESCRIPTION OF THE DRAWINGS

FIG. 2 illustrates an example user interface that may be used by a user to view and analyze attributes and event information associated with entities and entity groups stored in the database.

FIG. 3 illustrates an example user interface that may be displayed in response to a user requesting to drill down on a specific entity group, in accordance with some embodiments.

DETAILED DESCRIPTION

Overview

Figure 1:
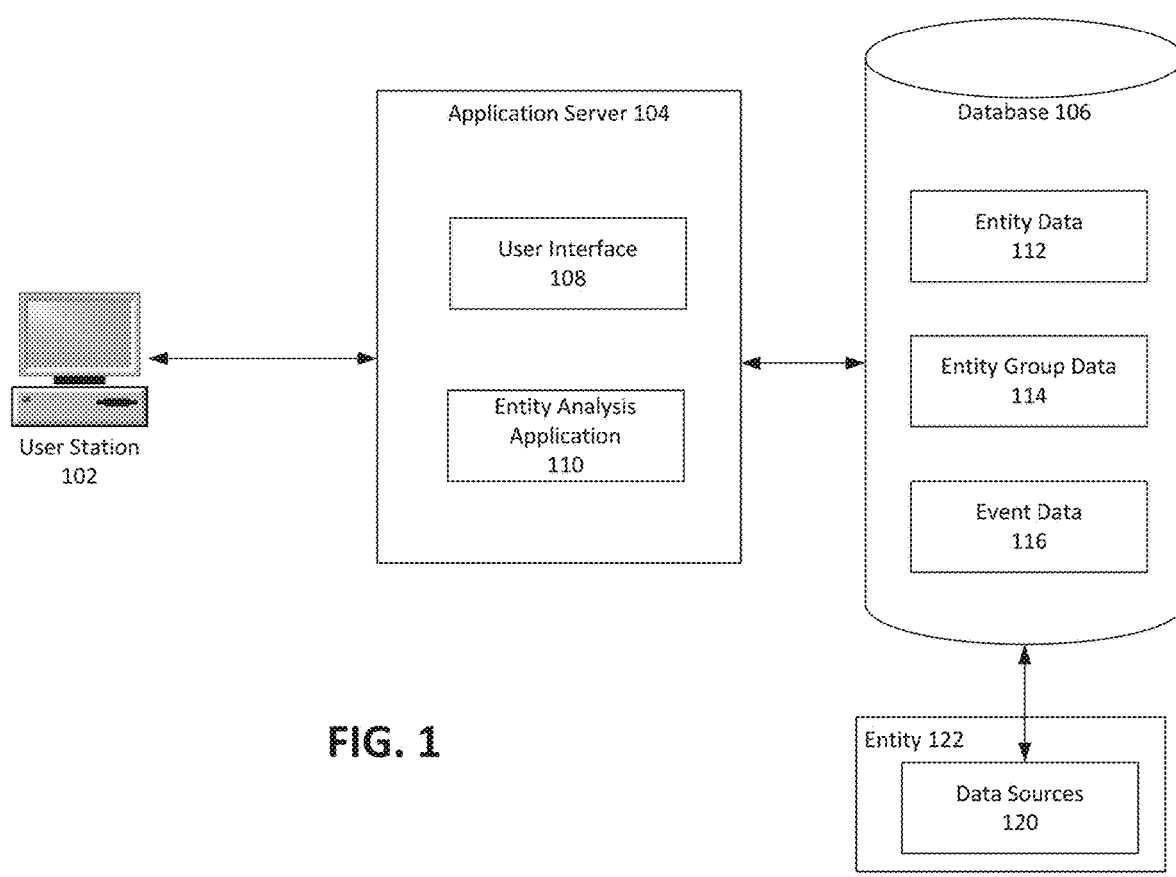
FIG. 1 illustrates a system that may be used for entity analysis in accordance with some embodiments.

When managing a large number of entities, it is often very important for a user to able to obtain a clear picture of how the entities are performing, individually and in the aggregate. As the number of entities increases, it can become more and more difficult for the user to digest information received concerning the various entities.

For example, a user may be managing the operations of a plurality of manufacturing robots or machines within a particular factory, facility, or assembly line. Data may be received from one or more data sources associated with each machine, which may be used to determine various attributes of the machines over time, such as machine operating status, machine productivity, machine power consumption, pressure, voltage, and/or the like. In some embodiments, the data sources may comprise one or more sensors associated with the machine. The data sources may also comprise a data store or document containing data associated with a machine (e.g., a spreadsheet recording historical data associated with a machine). Additional information for each machine may also be received, such as jobs being performed on the machines (e.g., maintenance or upgrade jobs), cost of jobs being performed on the machines, machine downtime, and/or the like. This information may be utilized by the user to determine steps for maximizing production, assess the financial viability of one or more machines, factories, or facilities, and/or the like.

In another example, a user may be managing the operations of a plurality of oil or gas wells within a particular geographic region. Data may be received from one or more sensors or other types of data sources associated with each well, comprising various well attributes measured over time, such the operating status of the well, the oil production rate for the well, water production rate for the well, well pressure, drill depth, and/or the like. Additional information for each well may also be received, such as jobs being performed on the well, cost of jobs being performed on the well, and/or the like. This information may be utilized by the user to determine steps for maximizing production, assess the financial viability of one or more wells, and/or the like. In other embodiments, managed entities may comprise computers or servers on a network, wind turbines in a windfarm, mines within a geographic region, vehicles on a shipping route, and/or the like.

In these and other examples, when there are a large number of managed entities, the sheer volume of information may be overwhelming for the user. This may make it difficult for the user to identify potential issues and focus analysis on important areas.

In some embodiments, in order to aid the user in digesting the information received from the various entities being managed, entities may be aggregated into one or more groups. Aggregated attribute values for each group corresponding to the entities within the group may be presented to the user. The user may identify specific groups and entities for further analysis, and drill down into each group to view information for specific entities within the group.

In addition, alerts may be generated associated with specific entities notifying the user of issues relating to the entity. For example, in some embodiments, a status associated with each entity may be tracked. When the status of an entity is an undesired state (e.g., closed or non-operational), the entity may be flagged and presented to the user for review. Upon review, the entity may be un-flagged for a specified period of time, or until a detection of condition inconsistent with the entity state occurs, prompting further review by the user.

As used herein, the term "entity" is a broad term including its ordinary and customary meaning, and includes but is not limited to any thing in the world. Entities may have a number of definable properties. For example, an entity may be a manufacturing facility (e.g., a factory, a building, a production facility, etc.), a manufacturing instrument (e.g., a machine, a part, a well, a turbine, etc.), a group of manufacturing instruments (e.g., a group of machines, a group of parts, a group of wells, a group of turbines, etc.), a device or system (e.g., an electronic device, a robotic system, a computer, a server, a network of computers, a network of servers, etc.), a geographic region, a reservoir, a mine, a field, a person, a place, a physical asset (e.g., ship, vehicle, airplane), an organization, a market instrument, and/or the like. Each entity may be associated with a unique identifier that uniquely identifies the entity, and may be represented electronically by a data object/entity associated with that entity. The entities attributes (e.g. metadata about the entity) may be represented in one or more properties associated with the data object/entity.

Further, as used herein, the term "sensor" is a broad term including its ordinary and customary meaning, and includes but is not limited to any device, system, or collection of devices or systems that can provide information associated with an entity (e.g., device, system, gauge, instrument, detector, antenna, monitor, or any kind of -scope, -meter, -graph). For example, a sensor may provide reporting values (e.g., measurements or other information) associated with a manufacturing instrument. The received values may comprise values related to physical attributes or measurements (e.g., temperature, pressure, size) values related to electronic activity or measurements (e.g., network traffic, IP addresses), and/or the like. The information provided by sensors may be utilized and analyzed for various purposes, as described herein.

In addition, as used herein, the term "entity data" may correspond to any type of data relating to the entity that can be measured or recorded over time. For example, entity data may comprise measured values received from one or more sensors associated with an entity, recorded values from one or more data stores or documents associated with an entity, and/or the like. In some embodiments, each entity data value may be associated with a time or time range (e.g., a time at which a sensor value was measured, a recorded value was recorded, and/or the like). In some embodiments, entity data associated with an entity may be processed or aggregated to determine one or more attribute values associated with the entity. For example, multiple types of entity data corresponding to a particular entity may be used to determine an operational status of the entity.

Accordingly, disclosed herein are various systems and methods for generating user interfaces for aggregating and analyzing large numbers of entities. While the present disclosure will refer to particular use cases, such as analyzing machines used for production or manufacturing, or analyzing oil/gas fields/reservoirs, the systems and methods disclosed herein may be applied to other fields and use cases, such as mining, energy generation, manufacturing, market research, financial investments, scientific studies, geographical surveys, shipping, computer network analysis, and/or the like. For example, in other embodiments, entities may correspond to various types of machines or robotic systems, computers, geological structures or formations, markets, financial entities, people, events, and/or the like.

Description of the Figures

FIG. 1 illustrates a system that may be used for entity analysis in accordance with some embodiments. The system comprises a user station 102, an application server 104, and a database 106, which may communicate directly with each other or over a network (not shown).

The user station 102 may correspond to any type of computing station that may be used to operate or interface with the applications in the system (e.g., applications on application server 104). Examples of such user stations include for example, workstations, personal computers, or remote computing terminals. User stations may also include mobile devices, such as smartphones, tablets, or touchscreen devices. The user station 102 comprises a display device, such as a display monitor, for displaying a user interface to users at the user station. The user station 102 also comprises one or more input devices for the user to provide operational control over the activities of the system, such as a mouse, keyboard, or touchscreen to manipulate a graphical user interface to generate user inputs (e.g., by manipulating a cursor or pointing object in the graphical user interface).

Application server 104 may be used to run one or more modules or applications that can be accessed by a user at user station 102, such as a user interface module 108 and an entity analysis application 110. The entity analysis application 110 may comprise a software application accessible by the user at user station 102 to perform a variety of operations on received data from database 106 or another data source. In some embodiments, entity analysis application 110 may be a web application that is accessed by the user at user station 102 through an internet or web browser, such as Internet Explorer, Mozilla Firefox, or Google Chrome. Entity analysis application 110 may contain analysis tools to be used by the user to view and drill down on various entity groups to analyze specific entities, based upon data received from database 106 and/or other data sources. For example, the user can view aggregate information for a particular entity group, and drill down on specific entities to determine which entities are contributing to an observed condition relating to the group. In addition, the user may receive alerts indicating that an entity is currently in a non-operational state, prompting the user to review the state of the entity to determine whether the current state of the entity is correct.

User interface module 108 may comprise a module configured to generate a user interface that may be viewed and interacted with by a user at user station 102, allowing the user to use the tools and modules contained within entity analysis application 110.

Database 106 may contain entity data and attributes 112, entity group data 114, and event data 116. Entity data and attributes 112 comprises data related to a plurality of entities which, as described above, may correspond to any object or system for which data may be provided (e.g., from one or more sensors or other data sources associated with the entity). In some embodiments, entity data 112 may also comprise historical data associated with the entities (e.g., historical sensor values and other parameter values associated with the entity). In addition, received entity data from one or more data sources may be used to determine one or more attributes corresponding to the entity (e.g., received production data for an entity may be used to calculate a weekly production attribute value for the entity).

In some embodiments, entities may be organized into one or more entity groups. Entity group data 114 comprises data related to the entity groups (e.g., which entities are associated with each entity group). In addition, each entity group may be associated with additional attribute data (e.g., overhead costs that apply to the entity group as a whole instead of being associated with individual entities).

In some embodiments, the database 106 may further comprise event data 116. Event data 116 may comprise data corresponding to events or alerts associated with one or more entities or entity groups. For example, an event may comprise the start of a job being performed on an entity or entity group, the completion of a job, the detection of a particular attribute value associated with an entity or entity group, and/or the like.

The database 106 may be a Relational Database Management System (RDBMS) that stores the data as rows in relational tables. The term "database," as used herein, may refer to a relational database (e.g., RDBMS or SQL database), a non-relational database, or may refer to any other data structure, such as, for example a comma separated values (CSV), extensible markup language (XML), text (TXT) file, flat file, spreadsheet file, and/or any other widely used or proprietary format. While the database 106 is shown as a distinct computing system, the database 106 may operate on the same computing system as the application server 104 and/or user station 102. In some embodiments, database 106 may correspond to multiple databases, and/or span multiple servers or computing devices.

In some embodiments, the entity analysis application 110 may be used to allow a user to view aggregate attribute values of one or more entity groups, each entity group comprising a plurality of entities. The user may drill down into an entity group to view attribute values at an entity level, in order to determine which entities of an entity group are contributing to a change in the aggregate attribute value of the entity group. In addition, in some embodiments the user can view cumulative cost data associated with jobs performed on the entities of an entity group against a production rate of the entity group, in order to determine the economic viability of the entities in the group. In some embodiments, the user may review closed or non-operational entities in an entity group. In order to ensure that entities do not remain closed for longer than necessary, closed entities may be periodically flagged for review by the user, or in response to a detection of a condition inconsistent with a stated reason for closure.

In some embodiments, the database 106 and/or application server 104 may be in communication with one or more data sources 120. In some embodiments, the one or more data sources 120 may comprise sensors that measure physical properties of one or more entities 122, such object sensors, instrument sensors, temperature sensors, pressure sensors, acoustic sensors, flow rate sensors, and/or the like. In some embodiments, the sensors may be embedded in a cable, such as a fiber optic cable that traverses across various depths above and/or below the ocean floor. In other embodiments, the sensors may be located on land (e.g., above and/or below ground). In some embodiments, the sensors may be placed on various parts of the one or more entities 122 (e.g., a temperature sensor located on a particular part of a machine entity to measure a temperature of a motor associated with the machine, a directional sensor placed on a particular part of a vehicle entity in order to measure a direction of travel of the vehicle). In some embodiments, the sensors may be implemented electronically or in software (e.g., a network monitor that monitors network traffic associated with a computer entity on a network). In some embodiments, the data sources 120 may include data sources other than sensors (e.g., data stores or documents containing recorded historical data associated with the entities 122).

In some embodiments, a compression system (not shown) may be coupled to the one or more sensors 120 and may provide an interface between the sensors 120 and the data store 106 and/or application server 104. In an embodiment, the compression system receives data measured by the data sources 120 and compresses and/or encodes the data. The compression system then transmits the compressed data for storage in the database 106 (e.g., in entity data 112). As an example, the stored sensor data may be implemented as a time-series data store as described in U.S. Provisional Application No. 62/171,875, titled "TIME-SERIES DATA STORAGE AND PROCESSING DATABASE SYSTEM" and filed on Jun. 5, 2015, the contents of which is hereby incorporated herein by reference in its entirety. U.S. Provisional Application No. 62/171,875 is included as part of this application in the Appendix. In some embodiments, the compression system may perform compression and encoding techniques as described in U.S. patent application Ser. No. 14/961,433, titled "DISTRIBUTED ACOUSTIC AND TEMPERATURE SENSING DATA-BASED SANDING DETECTION SYSTEM" and filed on Dec. 7, 2015, the contents of which is hereby incorporated herein by reference in its entirety. The compression system may provide several benefits. Because the encoded and compressed data may have a file size that is significantly smaller than a file size of the raw data, the encoded and compressed data may be transmitted from the sensors 120 and/or compression system to the database 106 and/or the application server 104 at a much faster rate. Moreover, the reduced file size allows for the real-time streaming of the data even with a limited bandwidth communication medium. Furthermore, the database 106 and/or the application server 104 may use a reduced processor load to parse and analyze the encoded and compressed data for display.

Viewing Entity Groups

FIG. 2 illustrates an example user interface 200 that may be used by a user to view and analyze attributes and event information associated with entities and entity groups stored in the database. At 202, one or more entity groups may be presented to the user. Each entity group may be associated with a plurality of different entities. For example, as illustrated in FIG. 2, entity group A is associated with 78 "type 1" entities and 45 "type 2" entities, while entity group B is associated with 69 "type 1" entities and 23 "type 2" entities. In some embodiments, entities may be associated with entity groups based upon name, location, age, and/or any other characteristic or combination of characteristics. For example, in the illustrated embodiments, a plurality of different machine entities may be organized into groups based upon which factory or facility they are in, by physical location (e.g., geographic region they are located in), by machine type, and/or the like.

In some embodiments, each entity is associated with one or more data sources, such as sensors (e.g., object sensors, instrument sensors, temperature sensors, pressure sensors, flow rate sensors, and/or the like) from which entity data values may be received. As discussed above, entity data may correspond to any type of data relating to the entity that can be measured or recorded over time. Entity data values from the data sources (e.g., measured sensor values, recorded values retrieved from a database or document) may be processed or aggregated to determine one or more different attribute values for the entity, such as an operational status of the entity, a production rate of the entity, and/or the like. Attributes values for the entities of an entity group can be aggregated to determine aggregate attribute values 204 for the group. These may include active entities (indicating a total number of entities associated with the group that are in operational status), production rates, consumption rates, aggregate status measurements, and/or the like. For example, for each entity in an entity group, measurement values from one or more data sources may be used to determine an attribute value for the entity over a given time period (e.g., a production rate value for the entity for a given day). The attribute values for entities in the group can be aggregated to determine an aggregate attribute value for the time period (e.g., an aggregate production rate value for the entity group on the given day).

Each displayed aggregate attribute associated with an entity group may be associated with a chart or graph 206 illustrating values of the attribute over a specified time period (e.g., values of the aggregate attribute each day over a week). In addition, a value difference 208 indicating a change in the value of the aggregated attribute 204 over a time period (e.g., the previous 24 hours) may also be displayed, allowing the user to be able to quickly determine how the aggregate attribute values associated with the entity group have changed over time.

In some embodiments, the interface 200 may contain one or more interface elements 214 allowing the user to specify a time to be displayed. This allows the user to view the aggregate attribute values of the entity groups at different points in time. In some embodiments, the user may also be able to select a desired time range, indicating a time period to be spanned by each of graphs 206 and/or value differences 208.

In addition, interface 200 may contain additional display areas 216 for displaying data corresponding to events associated with the entities and entity groups. Events may comprise indications of jobs (e.g., a safety inspection, a facilities upgrade, and/or the like) performed on one or more entities, alerts corresponding to the detection of a particular a attribute value or status of one or more entities (e.g., an alert in response to a particular attribute of an entity reaching a threshold value), automated updates or status reports on the attribute values associated with one or more entities or entity groups, updates or notes entered by the user or by another user, and/or the like. Each event may be associated with an entity, a plurality of entities, or with an entity group as a whole. In some embodiments, the displayed event information may be separated into different categories (e.g., performed tests, status changes, updates, operator notes, and/or the like).

The user, upon viewing the entity group information displayed in interface 200, may desire to drill down to view data related to individual entities within an entity group. For example, the user may notice that a particular entity group has experienced a large increase in production rate over a previous time period, and may desire to find out which entities in the entity group are most responsible for the change. As such, the user may select a particular entity group in order to drill down on the entity group and view attribute values for specific entities in the entity group.

FIG. 3 illustrates an example user interface 300 that may be displayed in response to a user requesting to drill down on a specific entity group, in accordance with some embodiments. In response to a user selection of a specific entity group (e.g., "B Group"), data corresponding to individual entities 302 associated with the entity group are displayed. Each entity 302 is displayed in conjunction with a status indicating a state of the entity (e.g., active or inactive), as well as a plurality of attribute values associated with the entity at the selected date (e.g., production rate, power consumption, maintenance status measurements, and/or the like). In addition, value differences may be displayed next to each displayed attribute value, indicating a change in the attribute value over a previous time period (e.g., the previous 24 hours). Therefore, a user is able to quickly determine which entities in the entity group are contributing the most to the aggregate attribute value of the entity group, and which entities are most responsible for changes in aggregate attribute values of the entity group.

In addition, interface 300 may further display event information at 304. The event information displayed at 304 may only comprise events that are associated with the particular entity group or with one or more entities of the entity group. These may include jobs being performed on entities in the entity group, status updates of entities in the entity group, user-entered notes regarding entities in the entity group, and/or the like.

By viewing aggregated attribute values for entity groups, the user can determine which groups of entities may require further analysis, without being overwhelmed by the sheer number of individual entities being managed. The user can then drill down into an entity group to view the individual entities associated with the group. For example, the user may notice a large change in production rate of a particular entity group. The user can then drill down into the particular entity to view how the production rates of individual entities within the entity group have changed. In addition, the user is able to view if any events associated with one or more entities of interest occurred within the previous time period that may account for the attribute value changes of the entity in question.

Figure 4:
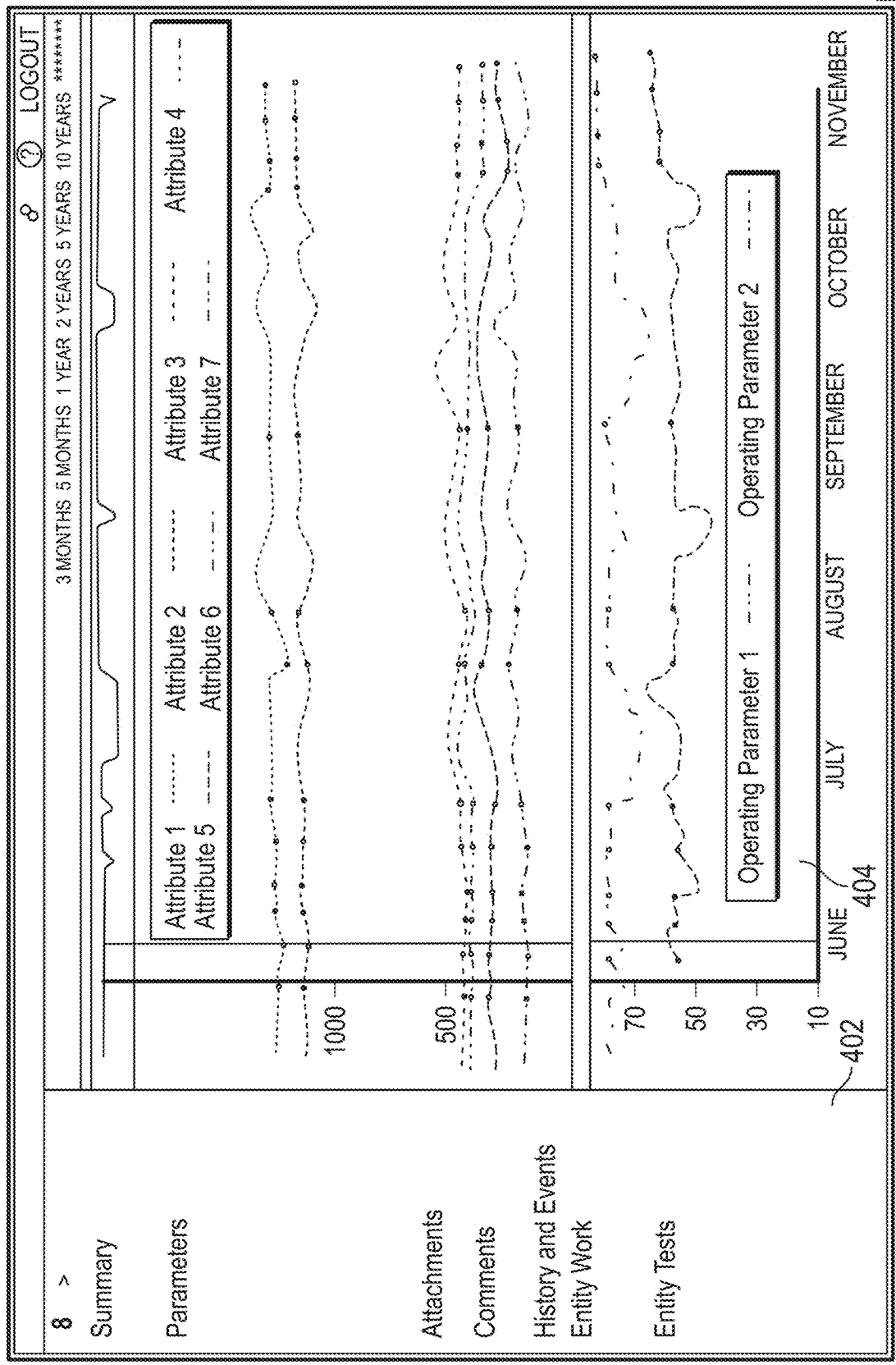
FIG. 4 illustrates an example user interface that may be displayed in response to a user selection of a particular entity of an entity group.

In some embodiments, the user may desire to view more specific information for a particular entity. For example, the user may identify a particular entity that experienced in unexpected change in a production rate attribute during a previous time period. FIG. 4 illustrates an example user interface 400 that may be displayed in response to a user selection of a particular entity of an entity group. Interface 400 may comprise one or more graphs 404 displaying historical data for one or more attributes or received entity data values (e.g., data values received from data sources or sensors) associated with the entity that can be used to calculate attribute values for the entity. As such, the user may be able to identify a cause of an attribute value change for an entity (e.g., a decrease in production rate over a particular time period may be due to a decrease in a measured pressure over the time period or other change in entity data values from a particular data source). The user is able to access graphs for different sensors associated with the entity at a sidebar 402. In addition, documentation and/or other information associated with the entity may also be accessed by the user through sidebar 402. In some embodiments, interface 400 may be implemented by a separate application that is launched in response to a user selection of a particular entity within entity analysis application 110.

Figure 5:
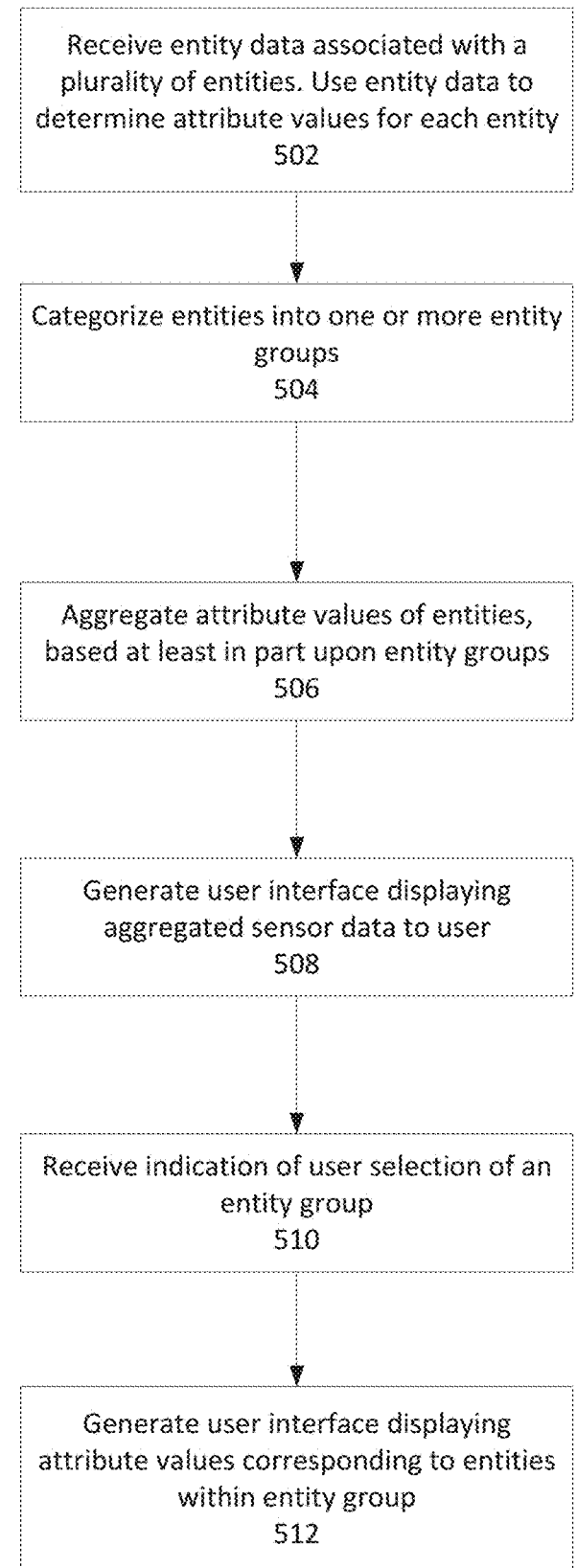
FIG. 5 illustrates a flowchart of a process for generating and analyzing entity group attributes values, in accordance with some embodiments.

FIG. 5 illustrates a flowchart of a process for generating and analyzing entity group attributes values, in accordance with some embodiments. At block 502, entity data associated with a plurality of entities is received. For example, in some embodiments, entities may correspond to machines, each associated with one or more data sources for measuring attribute values relating to the machines over time (e.g., sensors such as temperature sensors, pressure sensors, production counters, instrument sensors, traffic monitors, and/or the like, data stores or documents containing recorded historical data for the entity, etc.). In some embodiments, entities may correspond to other types of objects or systems, such as computers, wells, mines, geographic regions, financial entities, vehicles, and/or the like. In some embodiments, the received entity data may be used to determine one or more attribute values associated with each entity for a given time period, such as an operational status of the entity during a particular time period, or an production rate over the particular time period.

At block 504, the entities are categorized into one or more entity groups. Entities may be categorized into entity groups based at least in part upon one or more attribute values associated with the entities, such as name, location, age, etc. For example, entities corresponding to machines can be categorized into entity groups based upon which factory the machine is located on.

At block 506, the attribute values associated with the entities are aggregated, based at least in part upon the entity groups, to determine one or more aggregate attribute values for the entity group over a given time period. For example, the production rate values for a particular time period for the entities in an entity group may be summed to produce an aggregate production value corresponding to the group for the time period. The operational status attributes of the entities may be aggregated to determine an operational measure for the entity group (e.g., number of operational entities, distribution of entities between different operational statuses, and/or the like).

In some embodiments, an entity group may be associated with one or more additional attributes. For example, a particular entity group may be associated with one or more attribute values (e.g., overhead costs for operating a factory) that are not specific to any particular entity within the entity group.

At block 508, a user interface is generated to display the aggregated data to the user. For example, in some embodiments, the user interface may display a plurality of aggregated attribute values for each entity group. In addition, for each displayed aggregated attribute value, the user interface may display a chart or graph illustrating how the aggregate attribute value varied over time, or a difference value indicating a change in the aggregate attribute value in comparison to a previous value associated with a previous time period.

At block 510, an indication is received corresponding to a user selection of a particular entity group. For example, the user may observe an aggregate attribute value or change in an aggregate attribute value associated with a particular entity group worthy of further investigation, and may wish to find out which particular entities within the entity group are most responsible for the aggregate attribute value or change in the aggregate attribute value.

At block 512, a user interface is generated displaying attribute data corresponding to the entities associated with the selected entity group. Each entity may be associated with one or more displayed attribute values, such as an operational status, a production rate value, and/or the like. At least a portion of the displayed attribute values may be associated with an attribute change value, indicating a change in the attribute value over a previous period of time. As such, the user is able to view how each entity within the entity group contributes to the aggregate attribute value or change in the aggregate attribute value of the entity group.

In some embodiments, the user may further select one or more entities for deeper analysis. For example, the user may select a particular entity of interest to view one or more attribute value graphs associated with the entity, allowing the user to determine a cause of a particular attribute value change. In some embodiments, the user interface may also display at least a portion of the entity data (e.g., data received from sensors or other data sources) used to calculate the attribute values for the entity.

By analyzing aggregate attributes at an entity group level, drilling down to view attribute values at an entity level, and drilling further down to view underlying entity data for a particular entity, a user can identify attribute values of interest, and focus on investigating the causes of changes in those attribute values, while avoiding being overwhelmed by information from a large number of entities at once.

Analyzing Entity Jobs

In some embodiments, one or more jobs may be performed on one or more of the entities managed by the user. These jobs may include jobs to improve the safety of an entity, jobs to improve a production level of the entity, and/or the like.

In order for the operation of an entity to be profitable, the production rate realized by the entity should be worth more than the cost of performing jobs on the entity. For example, for an factory entity, it would make economic sense to keep the machine in operation so long as the costs of operating the machine, including the costs of performing jobs on the well (e.g., maintenance jobs, safety upgrades, and/or the like), does not exceed the worth of production by the machine. If, on the other hand, the cost of performing jobs on the machine exceeds the worth of production, then it may no longer make sense to keep the entity in operation.

In addition, in some embodiments an entity group may be associated with one or more jobs or costs that are not specific to any particular entity in the group. For example, certain jobs may be associated with an entity group as a whole (e.g., overhead costs for operating a factory) that not are not associated with any specific entity within the group. As such, simply viewing each entity on an individual basis may not be sufficient, as doing so may not accurately reflect the costs associated with the operation of the entities.

In some embodiments, job data and production data are stored in separate data sources. For example, job data may be stored as part of event data 116 as illustrated in FIG. 1, where each job may be associated with a job description, job start/end times, job cost, an estimated or predicted production rate change associated with the job, and/or the like. On the other hand, production data may be stored as part of entity data 112 or entity group data 114, and may be determined based upon received measurements from one or more sensors or other data sources associated with the entities.

Job data from a first data source and production data from a second data source can be retrieved and mapped in order to correlate a change in production rate with each job. For example, in some embodiments, each job may be associated with a time, such as a start time, end time, and/or one or more checkpoint times. A production rate value at a time prior to the start of job and a production rate at a time after the completion of the job may be used to determine a production rate change associated with the job. In some embodiments, certain types of jobs are not associated with a production rate change. For example, jobs to improve the safety of one or more entities are typically not intended to have an effect on production rate, and so may not be considered when mapping production rate changes to jobs.

Figure 6:
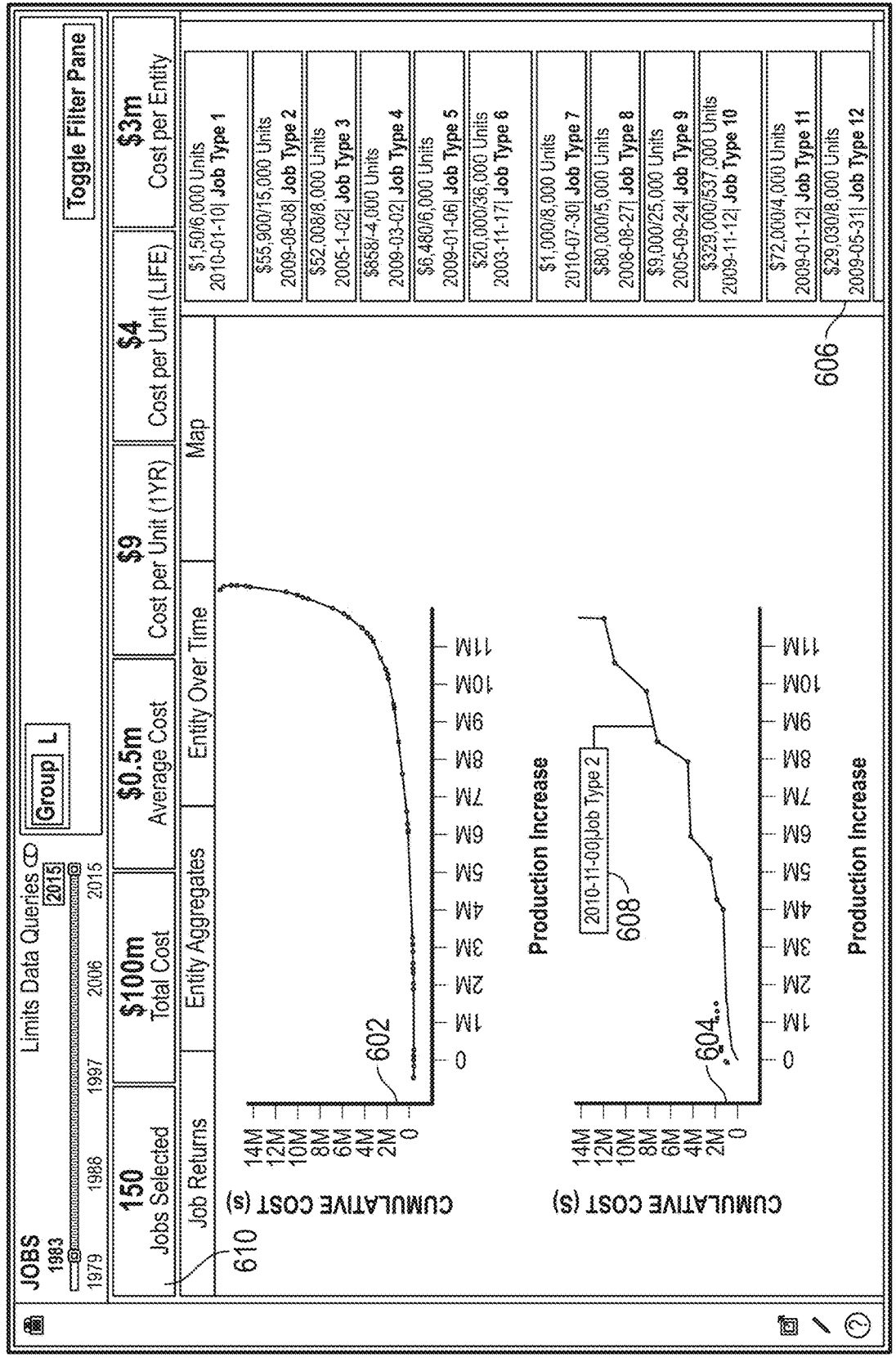
FIG. 6 illustrates an example user interface that may be used by a user to assess job costs against production rate for an entity group.

The job and production data can be used to create one or more charts, in order to aid the user in assessing and analyzing the cost of operating the entity group versus the production associated with the entity group. FIG. 6 illustrates an example user interface 600 that may be used by a user to assess job costs against production rate for an entity group. In some embodiments, interface 600 comprises a first plot 602 mapping cumulative costs against estimated production rate, and a second plot 604 mapping cumulative costs against actual production rate.

In some embodiments, first chart 602 may comprise a plot that maps the cumulative cost of jobs performed on an entity group against an estimated production rate of the entity group. Each job may be associated with a job time, a job cost. In addition, jobs may be associated with an estimated or expected production rate or production rate change. The retrieved jobs can be analyzed chronologically in order to determine a cumulative cost associated with the entity group at different points in time. For example, the cumulative cost associated with a particular time may be based upon a sum of the costs of all jobs on or before that time. For each retrieved job, the cumulative cost up to the time of the job can be mapped to the estimated production rate for the jobs in order to produce the plot of first chart 602. If estimated production rate continues to increase as cumulative cost increases, it may indicate that the performance of further jobs on the entity group can be expected to have a positive effect on the production rate of the entity group. However, if the plot of first chart 602 begins to curve back on itself, indicating that higher cumulative costs are no longer leading to higher production rates, the entity group may be a candidate for closure, as it may no longer make economical sense to continue operating the entity group.

Second chart 604 comprises a chart mapping the cumulative costs of jobs performed on an entity group against the actual production rate. For each job, the calculated cumulative cost up to the time of the job (based upon job data retrieved from the first data source) is mapped to an actual production rate associated with the time (based upon production data retrieved from a second data source). As such, the relationship between the cumulative costs incurred from performing jobs on the entity group and the production rate associated with the entity group can be determined, allowing the user to assess how the performed jobs are affecting the production rate of the entity group.

In some embodiments, information for the retrieved jobs may be displayed at 606. Each job may be associated with a job name/description, a job date, a job cost, and a production rate change associated with the job. In some embodiments, the user may select a job from the jobs displayed at 606, causing a data point on first chart 602 and/or second chart 604 corresponding to the selected job to be highlighted (e.g., at 608). In addition, when a user selects a data point in first chart 602 or second chart 606, a corresponding job displayed at 606 may be highlighted.

In addition, interface 600 may further display a plurality of job cost and production rate metrics at 610. These may include a total number of job being analyzed, a total cost of the jobs, an average job cost, an average cost incurred per entity in the entity group (e.g., per well), one or more price metrics (e.g., price of produced goods, to assess a value of the production of the entities), and/or the like.

Figure 7:
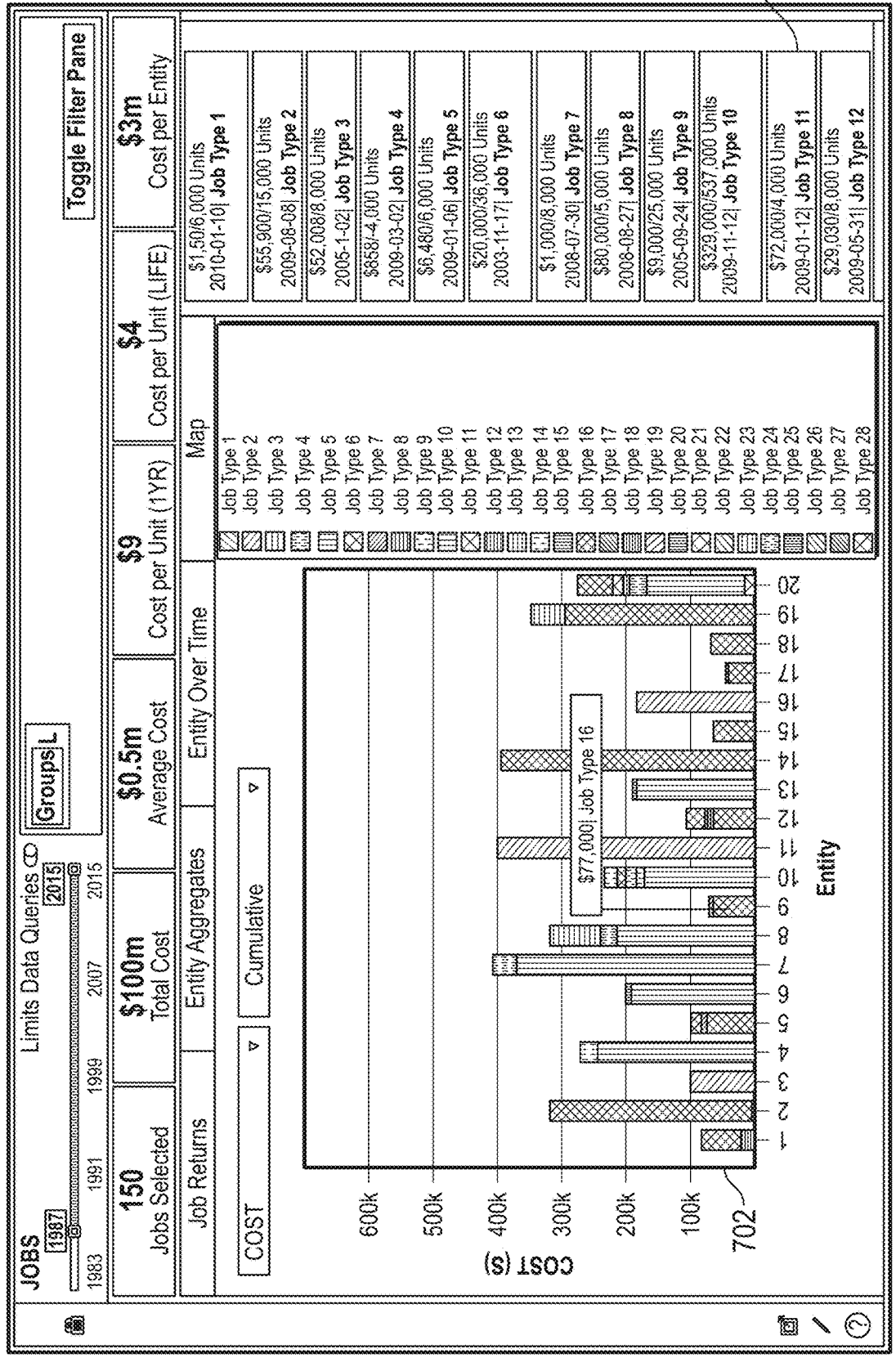
FIG. 7 illustrates an example user interface that may be used to analyze the costs associated with entities associated with an entity group, in accordance with some embodiments.

FIG. 7 illustrates an example user interface 700 that may be used to analyze the costs associated with entities associated with an entity group, in accordance with some embodiments. In some embodiments, interface 700 comprises a chart 702 displaying cumulative costs associated with each entity of an entity group. Each entity may be associated with a bar indicating a total cost associated with the entity. The bar may be divided into different subsections indicating costs of specific jobs performed associated with the entity. The subsections may be colored or have some type of visual indicator indicating a job type (e.g., a safety job, a production job, and/or the like). The user may restrict the analyzed jobs reflected in chart 702 by job date, job cost, job type, and/or the like. For example, the user may restrict analyzed jobs to those before between January 2014 and January 2015, in order to view the cumulative cost spent on various jobs for each entity of an entity group during the selected time period.

In some embodiments, jobs associated with the entity group as a whole instead of with a specific entity may have its associated cost divided between the different entities of the entity group. For example, for a particular entity that is part of an entity group comprising ten entities, a job associated with the group may have one-tenth of its cost associated with each entity in the group.

Figure 8:
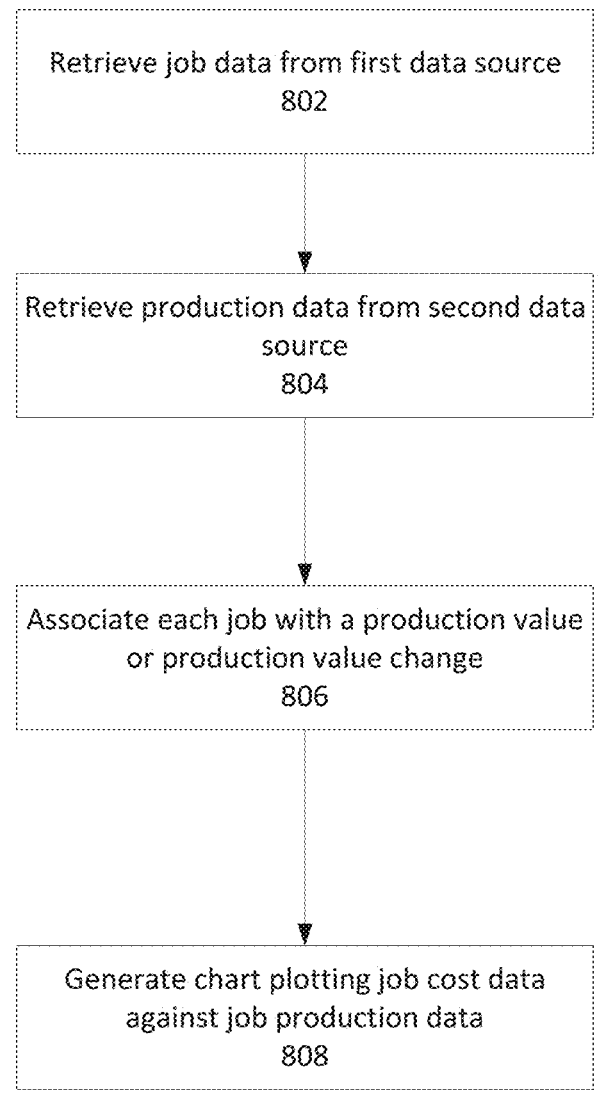
FIG. 8 illustrates a flowchart of a process for analyzing operating costs associated with an entity group with against the productivity of the entity group.

FIG. 8 illustrates a flowchart of a process for analyzing operating costs associated with an entity group with against the productivity of the entity group. At block 802, a first data source is accessed to retrieve job data. The job data may include a plurality of attribute values associated with each job, such as job name/description, job date, job cost, estimated production rate or production rate change associated with the job. In some embodiments, each job may be associated with a particular entity of the entity group, or with the entity group as a whole. Each job may also be associated with a cumulative job cost, based upon a sum of the costs of all previous jobs, calculated at an entity level or an entity group level. In some embodiments, the job data may be retrieved based at least in part upon a request specifying one or more dates or date ranges.

At block 804, a second data source is accessed to retrieve production data. The production data comprises may comprise production data associated with each entity of the entity group (e.g., based upon measurements from one or more sensors associated with each entity of the entity group, recorded data from one or more data sources associated with the entities of the entity group, and/or the like). In some embodiments, the production data may comprise production rate data (e.g., in the context of factory machines, the production rate may be measured in goods produced per day) measured at different points in time.

At block 806, at least a portion of the retrieved jobs are associated with a production rate or production rate change.

In some embodiments, jobs are mapped to production rate data based upon a date of the job and/or an entity associated with the job. In some embodiments, a production rate associated with a date before a job and a production rate associated with a date after a job are used to determine a production rate change associated with the job.

In some embodiments, if the retrieved jobs are not associated with a cumulative cost, a cumulative cost may be calculated for each job by aggregating the costs of prior jobs that were performed on the entity or entity group associated with the job. In some embodiments, certain types of jobs may be excluded when calculating the cumulative cost. For example, a user may choose to exclude safety jobs and/or other types of jobs not intended to improve production of the entity or entity group when aggregating costs of prior jobs for the purpose of determining a cumulative cost for a job. Thus, a particular job can be mapped to both a cumulative cost and a production rate or production rate change.

At block 808, one or more charts are generated mapping cumulative job costs against production rates. In some embodiments, the one or more charts may comprise a first chart mapping cumulative job costs against estimated production rates, and a second chart mapping cumulative job costs against actual production rates. In some embodiments, the one or more charts may comprise a bar chart indicating job costs associated with each entity of the entity group.

By mapping the cumulative costs of jobs performed on an entity group with the production rate associated with the entity group, the effects of jobs on production rate can be assessed and used to make decisions regarding whether it is worthwhile to continue to keep the entity group in operation.

Entity Operating Status

When maintaining a group of entities, different entities may have different operational statuses at a given time. For example, for a group of entities, at any given time some of the entities may be operational while others may be inactive or closed. Entities may be closed for a variety of different reasons, such as due to unsafe conditions, because a job is being performed on the entity, cost-saving reasons, and/or the like. As used herein, the term "closed" may refer to any non-operational or non-productive state associated with an entity.

In order to maximize productivity, it may be important to have as many entities are operational at a time as possible. As such, entities should not be closed for a longer time than necessary. In order to ensure that as many entities are operational for as long as possible, it is important to be able to determine if any entities are closed when they should not be. For example, if an entity is closed due to certain conditions, and those conditions no longer exist or have changed, it becomes necessary to evaluate whether the entity should remain closed or not.

In some embodiments, when an entity is closed, a user may be required to record a reason for closure. The reason for closure may comprise an attribute value associated with the entity being at an undesired value (e.g., a pressure value associated with the entity being at an unsafe level), a job to be performed on the entity requiring the closure of the entity, a cost-saving reason (e.g., to reduce an overall electricity consumption of the entity group), and/or the like. A monitor may be generated based upon the stated reason for closure, in order to track the attribute value or job status associated with the stated reason. If the stated reason for closure is inconsistent with actual conditions (e.g., the job to be performed on the entity is completed, or if the attribute value is measured to be no longer at an undesirable value), the entity may be flagged for review, wherein the reviewing user may then opt to re-open the entity so that production can be resumed.

Figure 9:
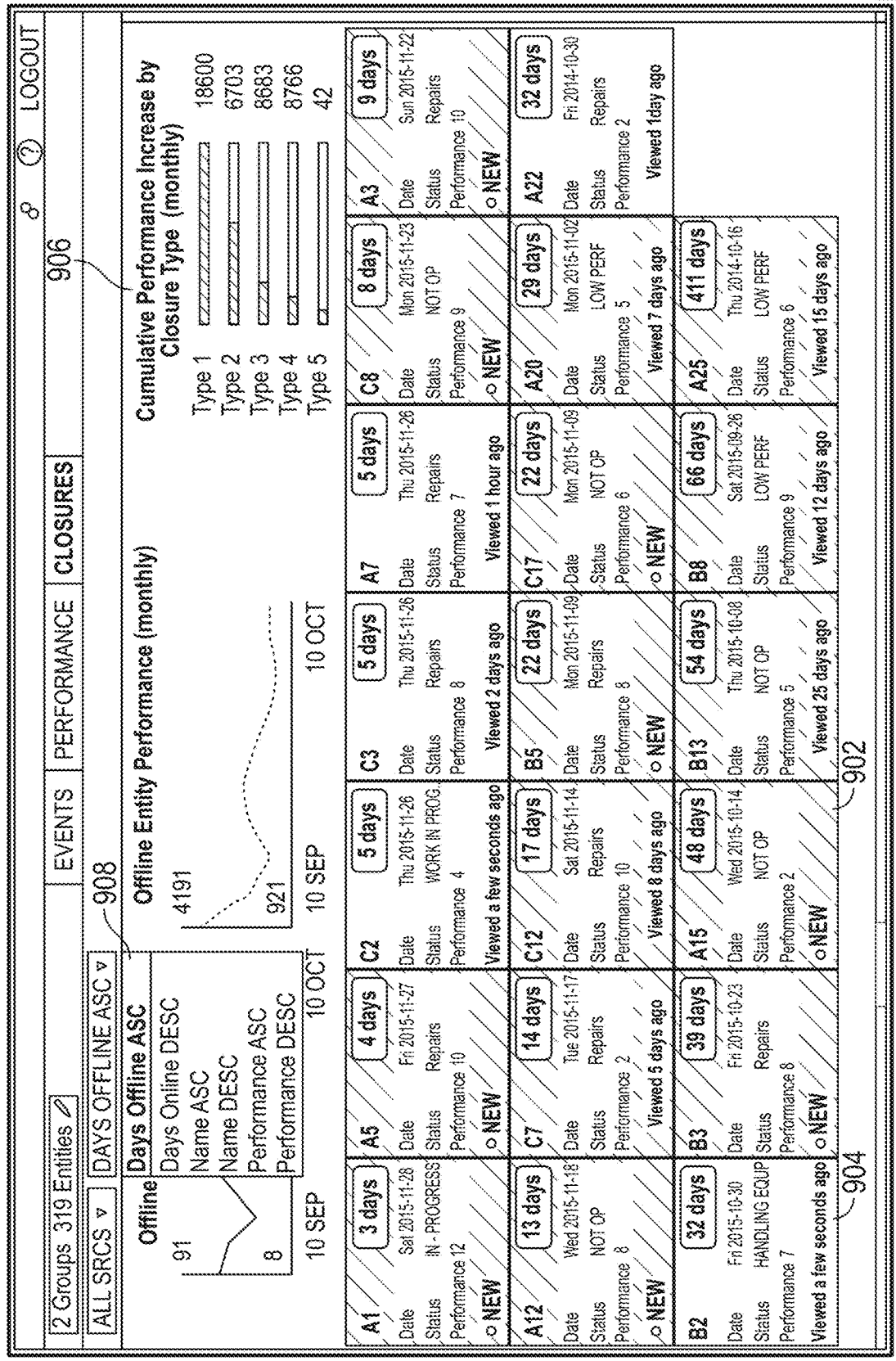
FIG. 9 illustrates an example user interface for presenting flagged entities to the user, in accordance with some embodiments.

FIG. 9 illustrates an example user interface 900 for presenting flagged entities to the user, in accordance with some embodiments. Interface 900 may display information for a plurality of closed entities 902. Each closed entity may be associated with a date of closure, a length of time closed, and a reason for closure. Each closed entity may also be associated with a "last viewed" date, indicating a most recent time the closed entity was reviewed by a user, or a "new" indication, if the closed entity has never been reviewed by the user since being closed.

In some embodiments, one or more of the closed entities may be flagged for review. Entities that are flagged for review may be highlighted in a different color (e.g., red) in order to stand out to the user. When an entity is first closed, it may automatically be marked as "new" and flagged for review. When a user has reviewed the entity, the flag may be removed. For example, entity 904 has been reviewed by the user, and is thus un-flagged and displayed in a different color.

After an entity is un-flagged, the entity may be flagged again for the user's review after a designated period of time (referred to as a "reflag time"). In some embodiments, the length of the reflag time may be based upon the stated reason for closure. For example, job to be performed on the entity may have different expected times of completion, or different attributes may be expected to fluctuate at different rates (e.g., an entity closed for a reason relating to a first attribute that fluctuates rapidly may be re-flagged in a shorter time period, compared to an entity closed for a reason relating to a second attribute that is expected to remain more stable over time). In some embodiments, the reflag time may be determined automatically based upon the stated reason for closure, or entered by a user at a time of closure. In some embodiments, the user, when reviewing the entity, may designate or change a length of the reflag time. In some embodiments, a length of the reflag time may also change based upon a length of time that the entity has been closed.

In some embodiments, when an entity is closed, a monitor may be generated based upon the stated reason for closure, in order to monitor an attribute value or job status related to the reason for closure. For example, if it is determined that a job being performed on the entity is complete, or if an attribute value associated with the entity is no longer within an undesirable range, the monitor may be triggered, flagging the entity for the user's review. The user will then be able to review the entity and determine whether the entity should remain closed or be re-opened. In some embodiments, the monitor associated with the closed entity may check the job status or attribute value associated with the reason for closure at designated periods of time. This period of time may be shorter than the reflag time.

By monitoring the job status or attribute value associated with the reason for closure, as well as re-flagging the closed entity for review periodically, the amount of production loss caused by entities being closed for too long or for the wrong reasons may be reduced. In addition, in the event that a reason for closure for a particular entity is inaccurate (e.g., due to human error), the entity will still be reviewed periodically to minimize the time that the entity is closed for longer than necessary.

In some embodiments, a closed entity may be associated with an expected production rate indicating a production rate that would be expected if the entity were open (also referred to as "deferred production"). In some embodiments, the deferred production rate may be based upon a measured production rate of the entity prior to closing. In some embodiments, interface 900 is configure to display the total deferred production rate of the closed entities in the group at 906, indicating to the user an amount of lost production due to the closure of the displayed entities 902. In some embodiments, one or more charts may be displayed indicating a plurality of metrics measured over time, such as number of entities closed, production lost, and/or the like. In some embodiments, interface 900 may include one or more interface elements 908 allowing the user to sort the displayed entities 902, such as by name, length of time closed, deferred production rate, flagged status, and/or the like.

In some embodiments, production rate may be associated with a manufacturing production rate (e.g., products produced by a machine at a factory), an energy production rate (e.g., barrels of oil extracted, watts of power generated, etc.), a mining production rate (e.g., amount of resources extracted from a mine), and/or the like. It is understood that in some embodiments, entities may be associated with attributes other than production rate. For example, in a shipping system comprising shipping entities (e.g., vehicles, ships, airplanes), an entity may be associated with a shipping capacity, which may be used to determine a "deferred capacity" when the entity is non-operational. In another example, a computer network comprising computer or server entities may be associated with "processing rate" indicating an amount of processing performed, which may be used to determine a "deferred processing" measure when one or more computer/server entities are non-operational or offline.

Figure 10:
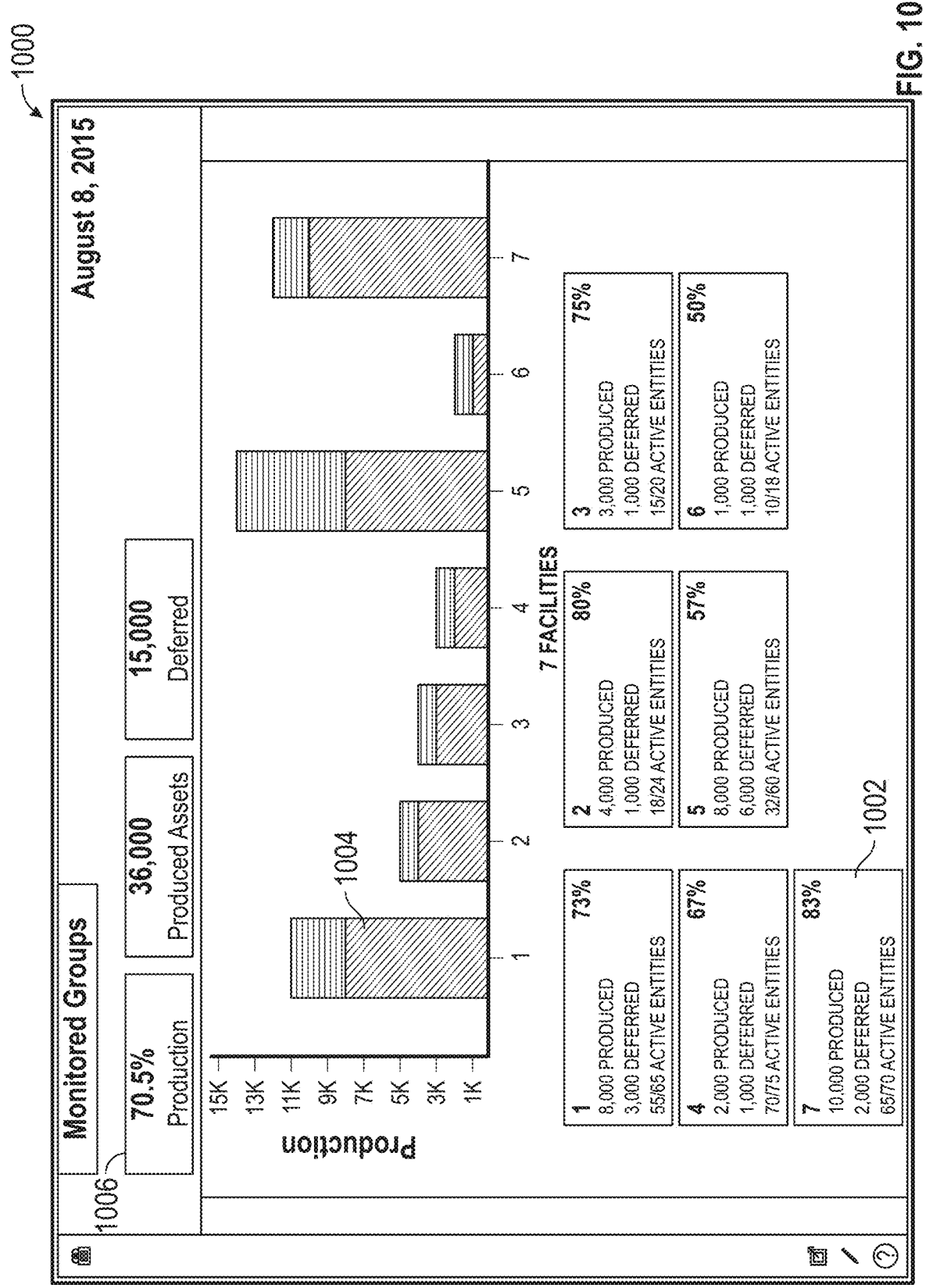
FIG. 10 illustrates an example user interface for assessing an impact of closed entities on entity groups, in accordance with some embodiments.

FIG. 10 illustrates an example user interface 1000 for assessing an impact of closed entities on entity groups, in accordance with some embodiments. In the illustrated interface 1000, a plurality of entity groups managed by the user are displayed at 1002. At any given time, each entity group may contain one or more closed entities. The information displayed for each entity group may indicate an aggregate production rate associated with the entity group, a deferred production rate associated with all closed entities in the entity group, a production efficiency measure comparing the deferred production rate with the total production rate of the entity group (e.g., a percentage value). In some embodiment, aggregate values for all entity groups being analyzed may be displayed at 1006 (indicating a total production rate of the entity groups, a total deferred production of the entity groups, and an aggregate efficiency measure of the entity groups).

In some embodiments, interface 1000 may contain a chart 1004 illustrating the aggregate actual and deferred production rates of each entity group. For example, each entity group may be associated with a bar comprising a first section reflecting the aggregate actual production rate of the entity group, and a second section reflecting the aggregate deferred production rate of the entity group. This allows to user to quickly assess the actual and potential production rates for each entity group.

Figure 11:
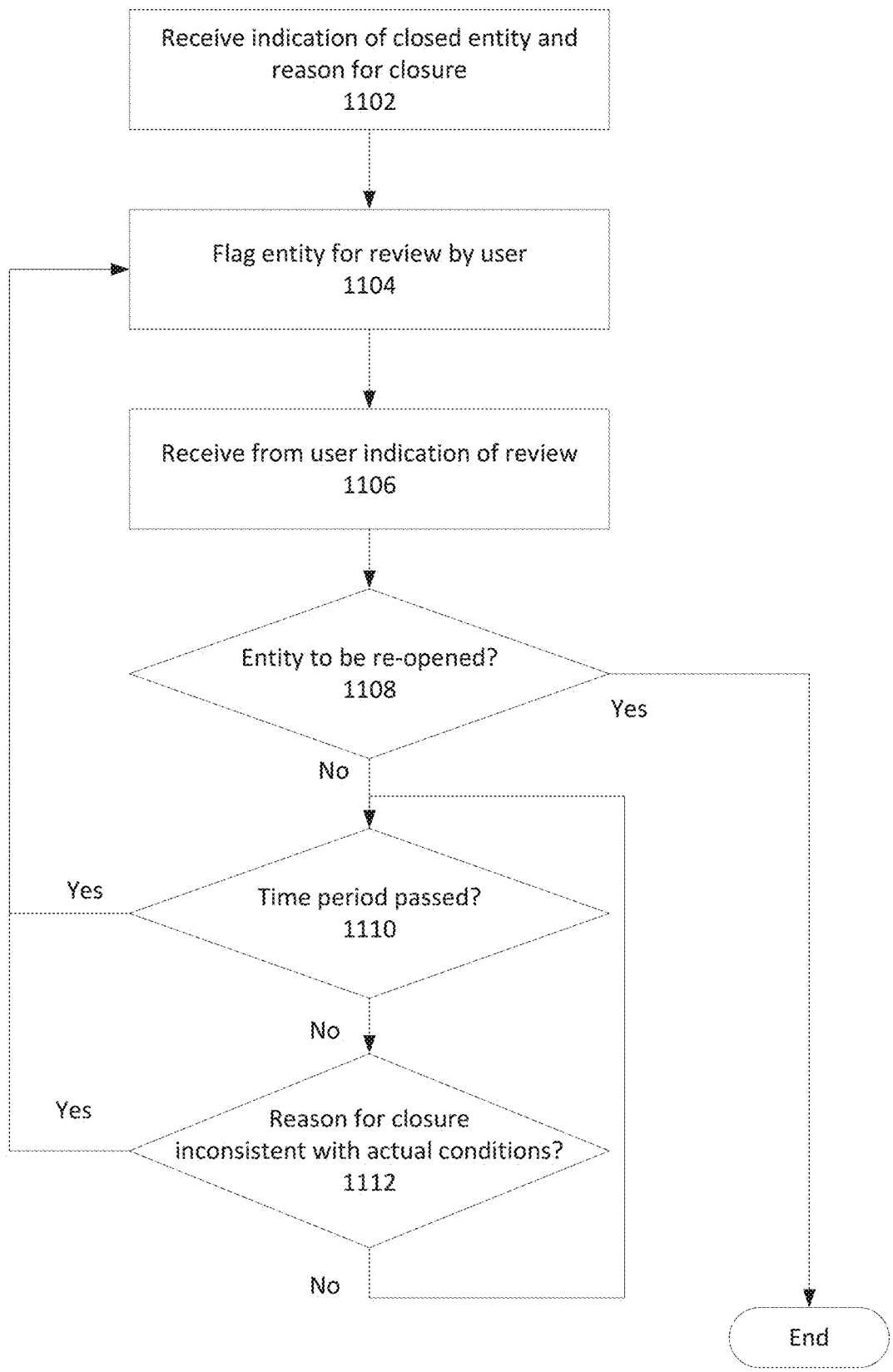
FIG. 11 illustrates a flowchart of a process for managing closed entities, in accordance with some embodiments.

FIG. 11 illustrates a flowchart of a process for managing closed entities, in accordance with some embodiments. At block 1102, an indication of a closed entity is received. In addition, a reason for closure associated with the entity may also be received. The reason for closure may correspond to a job being performed on the entity, an attribute value associated with the entity being measured within a particular value range, and/or the like.

At block 1104, the closed entity is flagged for review by the user. In some embodiments, the user may be presented with an interface displaying a plurality of closed entities associated with a selected entity group. Each closed entity may be associated with a date of closure, a recorded reason for closure, a length of closure, and/or a reviewed date indicating the last time the closed entity was reviewed by a user (or a "new" marker if the entity has yet to be reviewed by a user since closing). At least a portion of the closed entities may be flagged for review by a user. For example, in some embodiments, when an entity is first closed, it may automatically be flagged. In other embodiments, the entity is not flagged until a designated period of time after being closed, or if a condition (e.g., attribute value or job status) is detected that is inconsistent with the reason for closure occurs, whichever occurs first.

At block 1106, an indication is received indicating that the entity has been reviewed by the user. In some embodiments, the user, upon reviewing the entity, may change the status of the entity (e.g., flag the entity for re-opening). In some embodiments, the user may also change or update the recorded reason for closure.

At block 1108, a determination is made has to whether the entity is to be re-opened following review by the user, if so, the process ends and the entity may be removed from further review.

On the other hand, if the entity is to remain closed, then the entity may be un-flagged. At block 1110, a determination is made as to whether a designated period of time (referred to as a "reflag time") has passed since the user has reviewed the entity. In some embodiments, the reflag time may be based at least in part upon the recorded reason for closure associated with the entity. For example, if the reason for closure is based upon an attribute of the entity having a volatile value, the reflag time may be shorter compared to if the reason for closure is based upon an attribute with a more stable value. In some embodiments, the reflag time may be specified by a user (e.g., when the entity is first closed and/or when the entity is reviewed). If the reflag time has passed since the entity was last reviewed by the user, then the process may return to block 1104, where the entity is again flagged for review.

At block 1112, a determination is made as to whether a condition has been detected that is inconsistent with the reason for closure associated with the entity. In some embodiments, when an entity is closed, a monitor may be created that monitors the attribute value or job associated with the reason for disclosure. When a condition occurs that is inconsistent with the reason for closure (e.g., the attribute value is no longer within an undesired range, and/or the job has been completed), the process may return to block 1104, where the entity is re-flagged for review. Else, the process may return to block 1110. In some embodiments, the monitor may monitor the attribute value or job associated with the reason for closure periodically, wherein the period is typically shorter than the reflag time.

In some embodiments, when an entity is flagged or re-flagged (e.g., due to the passage of the reflag time and/or the monitor detecting a condition inconsistent with the reason for closure), an alert or notification may be generated to notify the user that an entity has been flagged for review. In some embodiments, the alert and/or notification is automatically transmitted to a device operated by a user associated with the alert and/or notification (e.g., a user responsible for reviewing closed entities). The alert and/or notification can be transmitted at the time that the alert and/or notification is generated or at some determined time after generation of the alert and/or notification. When received by the device, the alert and/or notification can cause the device to display the alert and/or notification via the activation of an application on the device (e.g., a browser, a mobile application, etc.). For example, receipt of the alert and/or notification may automatically activate an application on the device, such as a messaging application (e.g., SMS or MMS messaging application), a standalone application (e.g., an entity analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser or application window to open and be redirected to a login page generated by the entity analysis application so that the entity can log in to the entity analysis application and view the alert and/or notification. Alternatively, the alert and/or notification may include a URL of a webpage (or other online information) associated with the alert and/or notification, such that when the device (e.g., a mobile device) receives the alert, a browser (or other application) is automatically activated and the URL included in the alert and/or notification is accessed via the Internet.

Thus, the amount of time that entities are closed for longer than necessary or for the wrong reason may be reduced. By monitoring the attribute value or job status associated with the reason for closure, users may be alerted when the reason for closure of the entity becomes inconsistent with actual conditions. In addition, by periodically re-flagging each closed entity for review, the entity can still be reviewed even in the event that a reason for closure for a particular entity is inaccurate (e.g., due to human error), reducing the amount of time that the entity is closed for longer than necessary.

While the present specification may refer to the operation of oil or gas wells, the systems and methods described herein may be applied to many other types of applications. For example, in some embodiments, the systems and methods may be used in a manufacturing context, wherein each entity corresponds to a manufacturing machine. A user managing a plurality of machines may analyze how different machines or machines groups compare to each other, analyze the historical performance of machine groups and drilling down to individual machines, assessing the effects of jobs performed on the machines with expected performance, managing non-operation machines, etc.

Implementation Mechanisms

According to one embodiment, the techniques described herein are implemented by one or more special-purpose computing devices. The special-purpose computing devices can be hard-wired to perform the techniques, or can include digital electronic devices such as one or more application-specific integrated circuits (ASICs) or field programmable gate arrays (FPGAs) that are persistently programmed to perform the techniques, or can include one or more general purpose hardware processors programmed to perform the techniques pursuant to program instructions in firmware, memory, other storage, or a combination. Such special-purpose computing devices can also combine custom hard-wired logic, ASICs, or FPGAs with custom programming to accomplish the techniques. The special-purpose computing devices can be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device can be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 12:
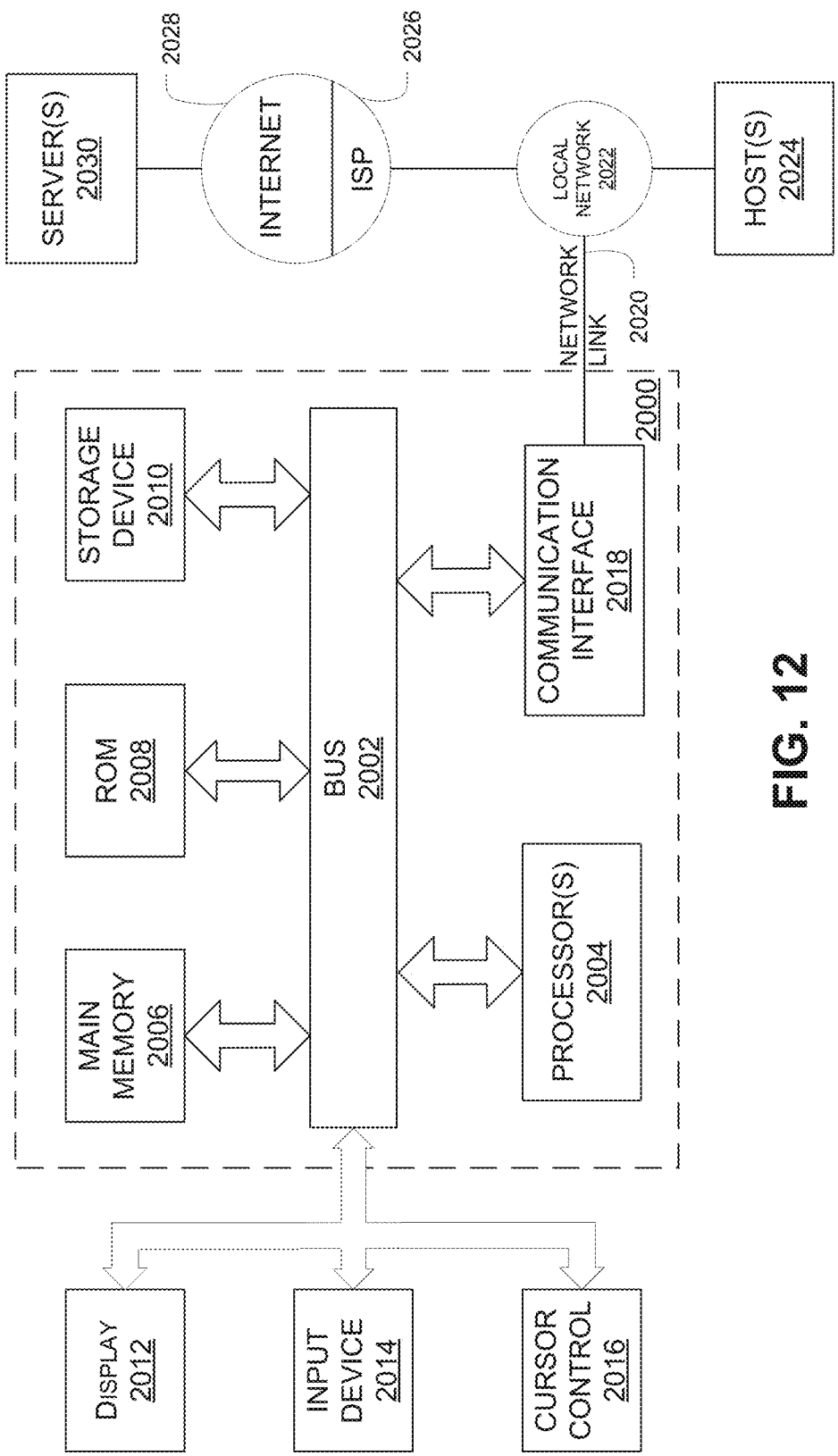
FIG. 12 illustrates a block diagram that illustrates a computer system upon which various embodiments can be implemented.

For example, FIG. 12 illustrates a block diagram that illustrates a computer system 2000 upon which various embodiments can be implemented. For example, any of the computing devices discussed herein can include some or all of the components and/or functionality of the computer system 2000.

Computer system 2000 includes a bus 2002 or other communication mechanism for communicating information, and a hardware processor, or multiple processors, 2004 coupled with bus 2002 for processing information. Hardware processor(s) 2004 can be, for example, one or more general purpose microprocessors.

Computer system 2000 also includes a main memory 2006, such as a random access memory (RAM), cache and/or other dynamic storage devices, coupled to bus 2002 for storing information and instructions to be executed by processor 2004. Main memory 2006 also can be used for storing temporary variables or other intermediate information during execution of instructions to be executed by processor 2004. Such instructions, when stored in storage media accessible to processor 2004, render computer system 2000 into a special-purpose machine that is customized to perform the operations specified in the instructions. Main memory 2006 can also store cached data, such as display settings for one or more graphs/charts, such as zoom levels, maximum and minimum values at each zoom level, etc.

Computer system 2000 further includes a read only memory (ROM) 2008 or other static storage device coupled to bus 2002 for storing static information and instructions for processor 2004. A storage device 2010, such as a magnetic disk, optical disk, or USB thumb drive (Flash drive), etc., is provided and coupled to bus 2002 for storing information and instructions. For example, the storage device 2010 can store measurement data obtained from a plurality of sensors or other data sources.

Computer system 2000 can be coupled via bus 2002 to a display 2012, such as a cathode ray tube (CRT) or LCD display (or touch screen), for displaying information to a computer user. For example, the display 2012 can be used to display any of the user interfaces described herein with respect to FIGS. 3A-3B. An input device 2014, including alphanumeric and other keys, is coupled to bus 2002 for communicating information and command selections to processor 2004. Another type of user input device is cursor control 416, such as a mouse, a trackball, or cursor direction keys for communicating direction information and command selections to processor 2004 and for controlling cursor movement on display 2012. This input device typically has two degrees of freedom in two axes, a first axis (e.g., x) and a second axis (e.g., y), that allows the device to specify positions in a plane. In some embodiments, the same direction information and command selections as cursor control can be implemented via receiving touches on a touch screen without a cursor.

Computing system 2000 can include a user interface module to implement a GUI that can be stored in a mass storage device as executable software codes that are executed by the computing device(s). This and other modules can include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or can be written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that can be combined with other modules or divided into sub-modules despite their physical organization or storage Computer system 2000 can implement the techniques described herein using customized hard-wired logic, one or more ASICs or FPGAs, firmware and/or program logic which in combination with the computer system causes or programs computer system 2000 to be a special-purpose machine. According to one embodiment, the techniques herein are performed by computer system 2000 in response to processor(s) 2004 executing one or more sequences of one or more instructions contained in main memory 2006. Such instructions can be read into main memory 2006 from another storage medium, such as storage device 2010. Execution of the sequences of instructions contained in main memory 2006 causes processor(s) 2004 to perform the process steps described herein. In alternative embodiments, hard-wired circuitry can be used in place of or in combination with software instructions.

The term "non-transitory media," and similar terms, as used herein refers to any media that store data and/or instructions that cause a machine to operate in a specific fashion. Such non-transitory media can comprise non-volatile media and/or volatile media. Non-volatile media includes, for example, optical or magnetic disks, such as storage device 2010. Volatile media includes dynamic memory, such as main memory 2006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but can be used in conjunction with transmission media. Transmission media participates in transferring information between non-transitory media. For example, transmission media includes coaxial cables, copper wire and fiber optics, including the wires that comprise bus 2002. Transmission media can also take the form of acoustic or light waves, such as those generated during radio-wave and infra-red data communications.

Various forms of media can be involved in carrying one or more sequences of one or more instructions to processor 2004 for execution. For example, the instructions can initially be carried on a magnetic disk or solid state drive of a remote computer. The remote computer can load the instructions into its dynamic memory and send the instructions over a telephone line using a modem. A modem local to computer system 2000 can receive the data on the telephone line and use an infra-red transmitter to convert the data to an infra-red signal. An infra-red detector can receive the data carried in the infra-red signal and appropriate circuitry can place the data on bus 2002. Bus 2002 carries the data to main memory 2006, from which processor 2004 retrieves and executes the instructions. The instructions received by main memory 2006 can retrieve and execute the instructions. The instructions received by main memory 2006 can optionally be stored on storage device 2010 either before or after execution by processor 2004.

Computer system 2000 also includes a communication interface 2018 coupled to bus 2002. Communication interface 2018 provides a two-way data communication coupling to a network link 2020 that is connected to a local network 2022. For example, communication interface 2018 can be an integrated services digital network (ISDN) card, cable modem, satellite modem, or a modem to provide a data communication connection to a corresponding type of telephone line. As another example, communication interface 2018 can be a local area network (LAN) card to provide a data communication connection to a compatible LAN (or WAN component to communicated with a WAN). Wireless links can also be implemented. In any such implementation, communication interface 2018 sends and receives electrical, electromagnetic or optical signals that carry digital data streams representing various types of information.

Network link 2020 typically provides data communication through one or more networks to other data devices. For example, network link 2020 can provide a connection through local network 2022 to a host computer 2024 or to data equipment operated by an Internet Service Provider (ISP) 2026. ISP 2026 in turn provides data communication services through the world wide packet data communication network now commonly referred to as the "Internet" 2028. Local network 2022 and Internet 2028 both use electrical, electromagnetic or optical signals that carry digital data streams. The signals through the various networks and the signals on network link 2020 and through communication interface 2018, which carry the digital data to and from computer system 2000, are example forms of transmission media.

Computer system 2000 can send messages and receive data, including program code, through the network(s), network link 2020 and communication interface 2018. In the Internet example, a server 2030 might transmit a requested code for an application program through Internet 2028, ISP 2026, local network 2022 and communication interface 2018.

The received code can be executed by processor 2004 as it is received, and/or stored in storage device 2010, or other non-volatile storage for later execution.

Additional Embodiments and Terminology

Each of the processes, methods, and algorithms described in the preceding sections can be embodied in, and fully or partially automated by, code modules executed by one or more computer systems or computer processors comprising computer hardware. The processes and algorithms can be implemented partially or wholly in application-specific circuitry.

The various features and processes described above can be used independently of one another, or can be combined in various ways. All possible combinations and sub-combinations are intended to fall within the scope of this disclosure. In addition, certain method or process blocks can be omitted in some implementations. The methods and processes described herein are also not limited to any particular sequence, and the blocks or states relating thereto can be performed in other sequences that are appropriate. For example, described blocks or states can be performed in an order other than that specifically disclosed, or multiple blocks or states can be combined in a single block or state. The example blocks or states can be performed in serial, in parallel, or in some other manner. Blocks or states can be added to or removed from the disclosed example embodiments. The example systems and components described herein can be configured differently than described. For example, elements can be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "comprising" as used herein should be given an inclusive rather than exclusive interpretation. For example, a general purpose computer comprising one or more processors should not be interpreted as excluding other computer components, and can possibly include such components as memory, input/output devices, and/or network interfaces, among others. The term "a" as used herein should also be given an inclusive rather than exclusive interpretation. For example, unless specifically noted, the term "a" should not be understood to mean "one" or "one and only one"; instead, the term "a" generally means "one or more" in open-ended claims or embodiments when used with language such as "comprising" or "including." Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions can be deleted, executed out of order from that shown or discussed, including substantially concurrently or in reverse order, depending on the functionality involved, as would be understood by those skilled in the art. Furthermore, the embodiments illustratively disclosed herein may be suitably practiced in the absence of any element or aspect which is not specifically disclosed herein.

It should be emphasized that many variations and modifications can be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computer system comprising:
   a non-transitory computer-readable storage medium storing program instructions; and
   one or more computer processors configured to execute the program instructions to cause the computer system to:
      access or receive sensor data from one or more sensors associated with physical assets, the sensor data comprising measurements over a time period;
      using the sensor data, aggregate attribute values associated with a group of one or more physical assets to determine one or more aggregate attribute values for the time period; and
      in response to a user selection of the group of the one or more physical assets, generate a first interactive user interface including:
         indications of the one or more aggregate attribute values for the group for the time period, and
         indications of attribute values for each of the one or more physical assets of the group for the time period.

2. The computer system of claim 1, wherein the first interactive user interface further comprises, for each of the one or more aggregate attribute values, a graph illustrating values of the aggregate attribute value over multiple previous time periods.

3. The computer system of claim 2, wherein the first interactive user interface further comprises, for each of the one or more aggregate attribute values, a change value indicating a change in the aggregate attribute value from a previous time period.

4. The computer system of claim 1, wherein the first interactive user interface further comprises one or more attribute values comprising at least an operational status and a production value.

5. The computer system of claim 1, wherein the one or more computer processors are configured to execute the program instructions to further cause the computer system to:
   access job data corresponding to a plurality of jobs, each job being associated with at least one physical asset of the one or more physical assets of the group, a job time, and a job cost;
   access production data comprising production values determined over time associated with the one or more physical assets of the group;
   associate each job with a cumulative cost, the cumulative cost indicating a total cost of jobs associated with physical assets of the group and based on the job costs;
   associate each job with a production value, based at least in part upon the job time; and
   generate a chart plotting cumulative costs against production values for the plurality of jobs.

6. The computer system of claim 5, wherein each job is associated with a production value change, based upon a first production value associated with a first time and a second production value associated with a second time, the first time occurring before the job time associated with the job, and the second time occurring after the job time.

7. The computer system of claim 1, wherein the one or more computer processors are configured to execute the program instructions to further cause the computer system to:
   in response to a physical asset being in a non-operational status, flag the physical asset for review by the user, wherein the physical asset is associated with a reason for non-operation;
   in response to a received indication that the user has reviewed the physical asset, unflag the physical asset; and
   re-flag the physical asset for review by the user in response to a detection that a designated period of time has passed since the user has previously reviewed the physical asset, or in response to detection of a change in a condition associated with the reason for non-operation, wherein the detected change is inconsistent with the reason for non-operation.

8. The computer system of claim 7, wherein the designated period of time is based at least in part upon an attribute value or job status associated with the reason for non-operation.

9. The computer system of claim 7, wherein the condition is associated with an attribute value of the physical asset, and wherein the detected change corresponds to a detection that the attribute value is not within an undesired value range.

10. The computer system of claim 7, wherein the condition is associated with a job status, and wherein the detected change corresponds to a change of the job status.

11. A computer-implemented method comprising:
    accessing or receiving sensor data from one or more sensors associated with physical assets, the sensor data comprising measurements over a time period;
    using the sensor data, aggregating attribute values associated with a group of one or more physical assets to determine one or more aggregate attribute values for the time period; and
    in response to a user selection of the group of the one or more physical assets, generating a first interactive user interface including:
       indications of the one or more aggregate attribute values for the group for the time period, and
       indications of attribute values for each of the one or more physical assets of the group for the time period.

12. The method of claim 11, wherein generating the first interactive user interface further comprises displaying, for each of the one or more aggregate attribute values, a graph illustrating values of the aggregate attribute value over multiple previous time periods.

13. The method of claim 12 wherein generating the first interactive user interface further comprises displaying, for each of the one or more aggregate attribute values, a change value indicating a change in the aggregate attribute value from a previous time period.

14. The method of claim 13, wherein generating the first interactive user interface further comprises displaying one or more attribute values comprising at least an operational status and a production value.

15. The method of claim 11, further comprising:
accessing job data corresponding to a plurality of jobs, each job being associated with at least one physical asset of the one or more physical assets of the group, a job time, and a job cost;
accessing production data comprising production values determined over time associated with the one or more physical assets of the group;
associating each job with a cumulative cost, the cumulative cost indicating a total cost of jobs associated with physical assets of the group and based on the job costs;
associating each job with a production value, based at least in part upon the job time; and
generating a chart plotting cumulative costs against production values for the plurality of jobs.

16. The method of claim 15, wherein each job is associated with a production value change, based upon a first production value associated with a first time and a second production value associated with a second time, the first time occurring before the job time associated with the job, and the second time occurring after the job time.

17. The method of claim 11, further comprising:
in response to a physical asset being in a non-operational status, flagging the physical asset for review by the user, wherein the physical asset is associated with a reason for non-operation;
in response to a received indication that the user has reviewed the physical asset, unflagging the physical asset; and
re-flagging the physical asset for review by the user in response to a detection that a designated period of time has passed since the user has previously reviewed the physical asset, or in response to detection of a change in a condition associated with the reason for non-operation, wherein the detected change is inconsistent with the reason for non-operation.

18. The method of claim 17, wherein the designated period of time is based at least in part upon an attribute value or job status associated with the reason for non-operation.

19. The method of claim 17, wherein the condition is associated with an attribute value of the physical asset, and wherein the detected change corresponds to a detection that the attribute value is not within an undesired value range.

20. A non-transitory computer-readable medium having software instructions embodied thereon, the software instructions executable by one or more hardware processors to cause the one or more hardware processors to:
access or receive sensor data from one or more sensors associated with physical assets, the sensor data comprising measurements over a time period;
using the sensor data, aggregating attribute values associated with a group of one or more physical assets to determine one or more aggregate attribute values for the time period; and
in response to a user selection of the group of the one or more physical assets, generate a first interactive user interface including:
indications of the one or more aggregate attribute values for the group for the time period, and
indications of attribute values for each of the one or more physical assets of the group for the time period.

* * * * *